(12) United States Patent
Naito et al.

(10) Patent No.: US 6,385,553 B1
(45) Date of Patent: May 7, 2002

(54) TIRE AIR PRESSURE ESTIMATING APPARATUS

(75) Inventors: Toshiharu Naito, Okazaki; Nobuyoshi Onogi, Nagoya; Takeyasu Taguchi, Obu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/210,960

(22) Filed: Dec. 15, 1998

(30) Foreign Application Priority Data

| Dec. 15, 1997 | (JP) | ............................................. 9-345382 |
| Jan. 16, 1998 | (JP) | ........................................... 10-006870 |
| Aug. 24, 1998 | (JP) | ........................................... 10-237064 |

(51) Int. Cl.$^7$ ............................................. B60C 23/00
(52) U.S. Cl. ......................... 702/138; 702/47; 340/344; 73/146.2
(58) Field of Search .................. 702/138, 47; 73/146.2; 340/58, 442, 443, 444

(56) References Cited

U.S. PATENT DOCUMENTS

| 4,574,267 A | 3/1986 | Jones ........................... 340/58 |
| 5,497,657 A | 3/1996 | Taguchi et al. ............. 73/146.2 |
| 5,541,859 A | 7/1996 | Inoue et al. ................... 702/47 |
| 5,553,491 A | 9/1996 | Naito et al. ................. 73/146.2 |
| 5,596,141 A | 1/1997 | Nishikawa et al. ......... 73/146.2 |
| 5,606,122 A | 2/1997 | Taguchi et al. ............. 73/146.2 |
| 5,982,279 A | * 11/1999 | Tominaga et al. ........... 340/444 |
| 6,092,028 A | * 7/2000 | Naito et al. .................... 702/47 |

FOREIGN PATENT DOCUMENTS

| JP | 8-219920 | 8/1996 |

* cited by examiner

*Primary Examiner*—Kamini Shah
(74) *Attorney, Agent, or Firm*—Harness, Dickey & Pierce, PLC

(57) ABSTRACT

In a tire air pressure estimating apparatus, wheel speeds of respective wheels are successively calculated when a vehicle is running. At least one of a tire resonance frequency and a tire spring constant is extracted from vibration frequency components included in a wheel speed signal with respect to each of tires. Tire air pressures of drive wheels are estimated based on the extracted tire resonance frequencies or the tire spring constants. Rotational state values (e.g. wheel speed values) of driven wheel tires are calculated based on the detected wheel speeds. Tire air pressures of driven wheels are estimated based on a deviation of the rotational state values of the driven wheel tires.

25 Claims, 20 Drawing Sheets

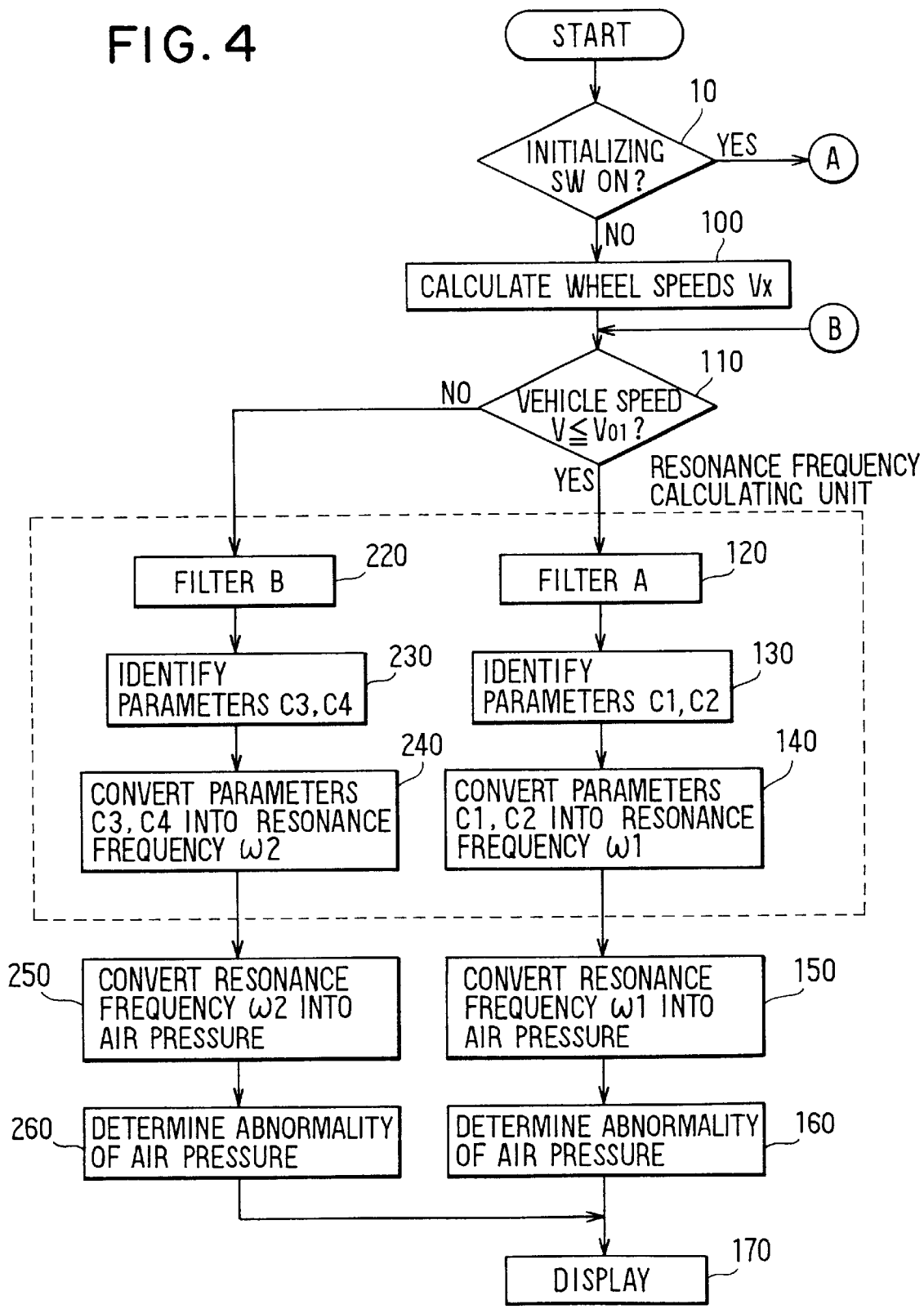

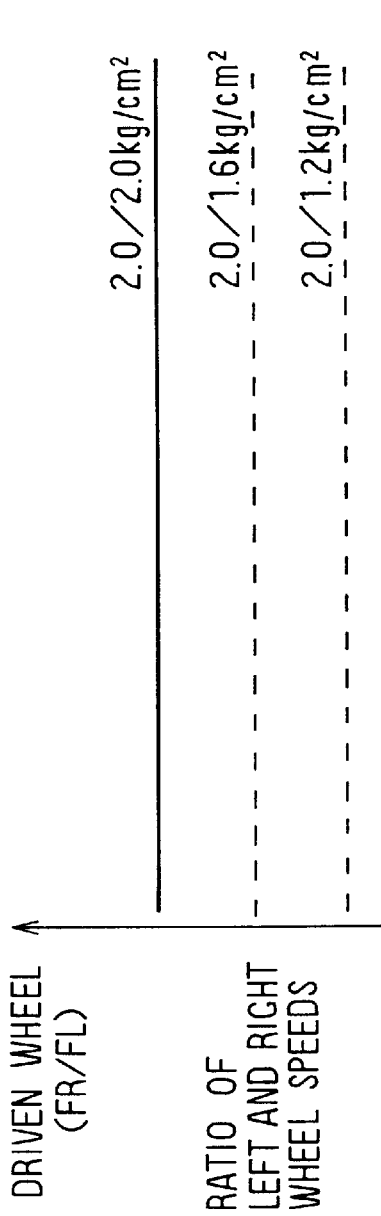
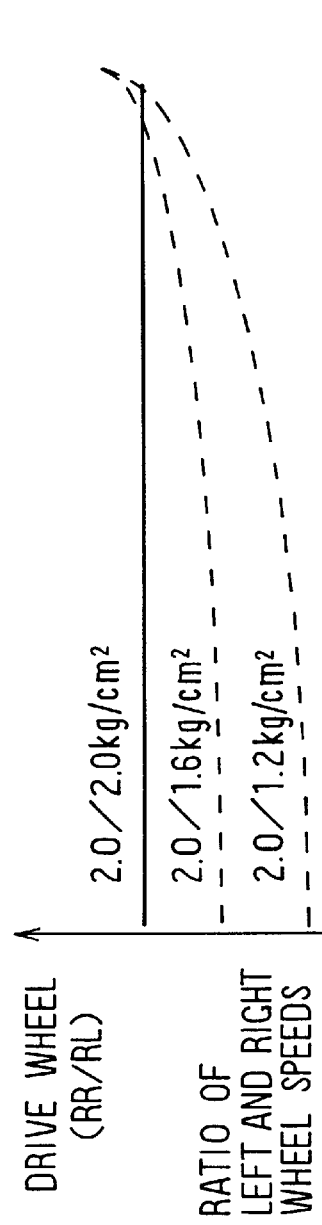
FIG.11A
FIG.11B

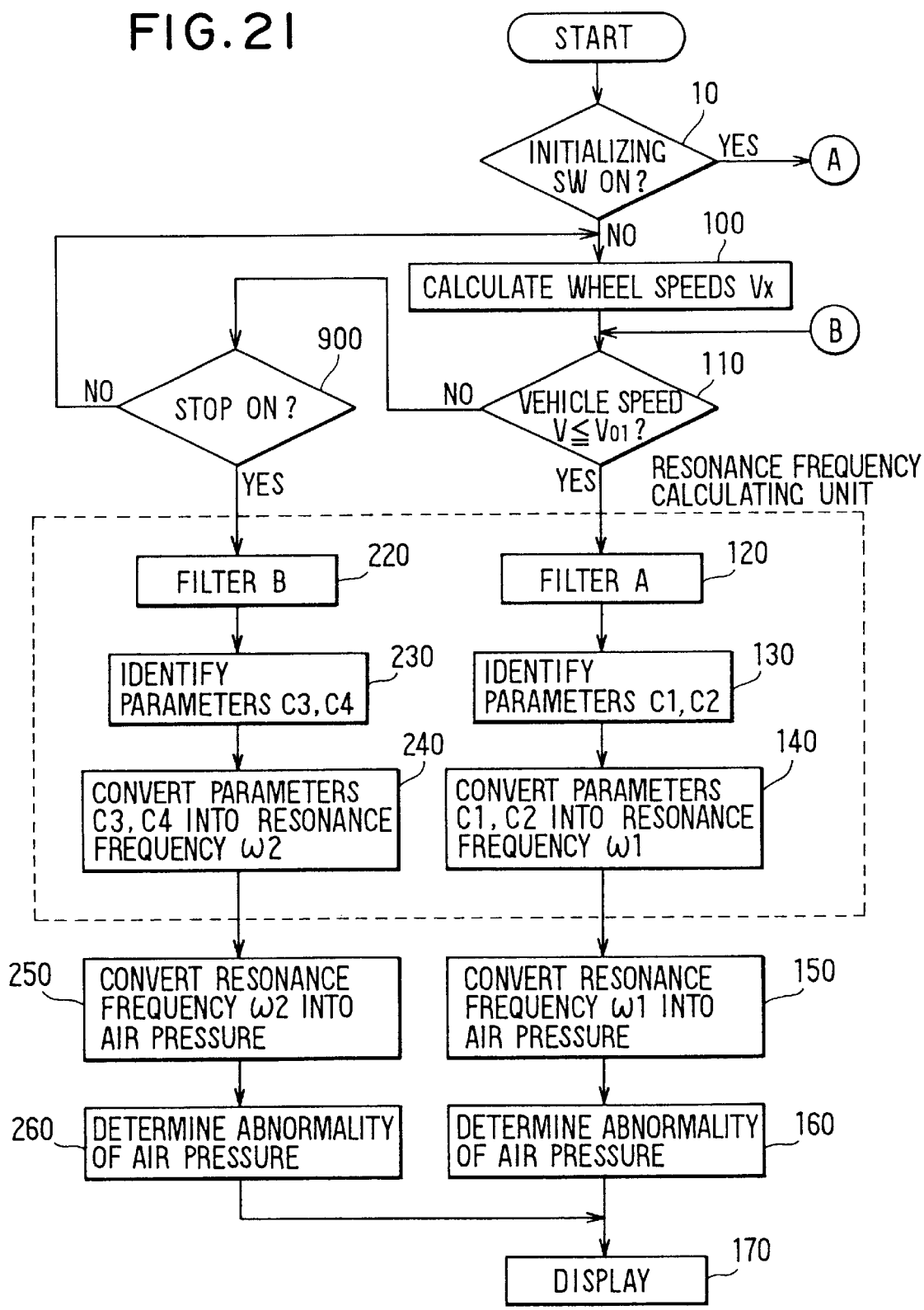

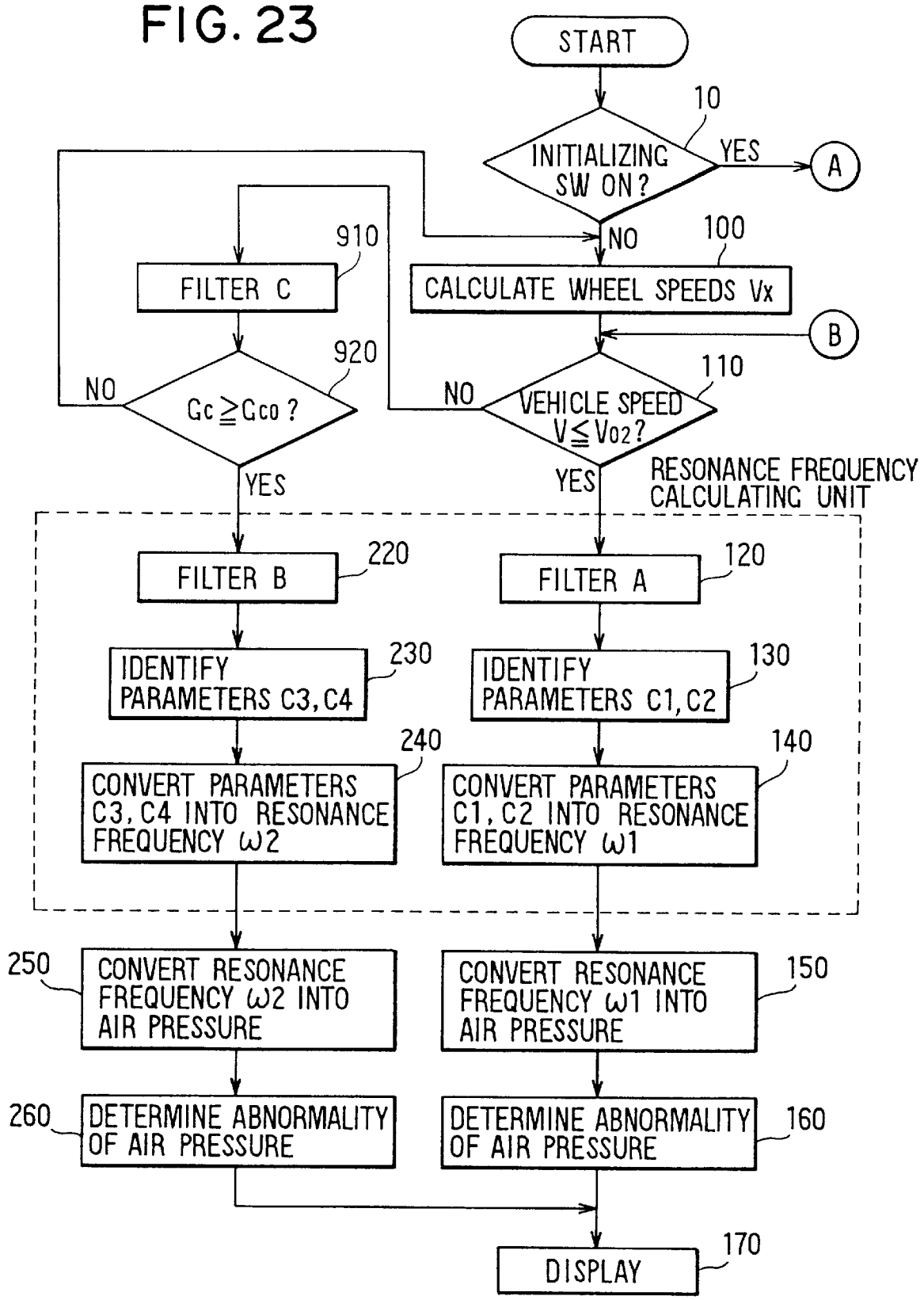

TIRE AIR PRESSURE ESTIMATING APPARATUS

CROSS REFERENCE TO RELATED APPLICATION

This application is based upon and claims the benefit of priority of Japanese Patent Applications No. 9-345382 filed Dec. 15, 1997, No. 10-6870 filed Jan. 16, 1998, and No. 10-237064 filed Aug. 24, 1998, the contents of which are incorporated herein by reference.

BACKGROUND OF THE INVENTION

1. Field of the Invention

The present invention relates to a tire air pressure estimating apparatus for indirectly estimating tire air pressure or change thereof in an automobile or the like.

2. Related Art

Japanese Patent Application Laid-Open No. 5-133831 discloses an apparatus of estimating an air pressure state of a tire. In the apparatus, a resonance frequency of a tire is extracted by carrying out frequency analysis with respect to a signal (wheel speed signal) including vibration frequency components of a tire. The tire air pressure state is detected based on the extracted resonance frequency.

The resonance frequency used when tire air pressure is estimated is about 30 through 50 Hz. However, as mentioned below, tire air pressure cannot be accurately estimated depending on situations in which the vehicle is put. For example, the tire air pressure can be estimated using a resonance frequency in a range of about 30 through 50 Hz when the running speed of a vehicle is in a low or middle speed range, like when the vehicle runs in an urban district or the like. However, when the running speed of the vehicle reaches a high speed range, a vibration phenomenon of a tire is difficult to cause. As a result, a power spectrum level of the resonance frequency is lowered and accuracy in estimating the tire air pressure is worsened.

For the problems as mentioned above, Japanese Patent Application Laid-Open No. 8-219920 teaches an apparatus in which plural resonance frequencies of a tire are extracted from plural frequency ranges, such as a range of about 30 through 50 Hz and a range of about 60 through 90 Hz, of the vibration frequency components included in the wheel speed signals. That is, when the running speed of a vehicle reaches a high speed range, the frequency range where the resonance phenomenon is intensified is changed from that of when the running speed of the vehicle is in a low through middle speed range. Therefore, when the frequency range used for estimating the tire air pressure is changed in accordance with the vehicle running speed range, the accuracy in estimating tire air pressure can be enhanced.

The inventors of the present application confirmed that a higher-order resonance frequency (for example, in a range of about 60 through 90 Hz) included in the wheel speed signal, greatly changes in response to change of the tire air pressure in a drive wheel of a vehicle, which is a characteristic suitable for estimating the tire air pressure. However, the inventors also found that, even when the higher-order resonance frequency is extracted, the change thereof in response to the change of the tire air pressure is small in a driven wheel, whereby accurate estimation of the tire air pressure is difficult.

SUMMARY OF THE INVENTION

Therefore, it is an object of the present invention to provide an apparatus capable of accurately estimating tire air pressures of respective wheels in accordance with characteristics thereof, even when running conditions of the vehicle is changed.

In a tire air pressure estimating apparatus according to the present invention, a vehicle speed detecting device successively calculates wheel speeds of respective wheels when a vehicle is running. An extracting device extracts at least one of a tire resonance frequency and a tire spring constant with respect to each of tires from vibration frequency components included in wheel speed signals which are detection results of the wheel speed detecting device. A first tire air pressure estimating device estimates tire air pressures of drive wheels based on the tire resonance frequencies or the tire spring constants extracted by the extracting device.

The tire air pressure estimating device further comprises a rotational state value calculating device for calculating rotational state values of the tires based on the wheel speed signals detected by the wheel speed detecting device, and a second tire air pressure estimating device for estimating the tire air pressures of driven wheels based on a deviation of the rotational state values calculated by the rotational state value calculating device.

That is, the tire air pressures of the drive wheels are estimated by the first tire air pressure estimating device carrying out frequency analysis in respect of the wheel speed signals, because the tire resonance frequencies or tire spring constants of the drive wheels can be extracted from vibration frequency components of tires included in wheel speed signals without being much influenced by vehicle running conditions such as a vehicle speed or the like. To the contrary, the tire air pressures of the driven wheels are estimated by using a dynamic load radius of a tire. This is because accuracy can not be ensured in estimating the tire air pressure by using frequency analysis in respect of the wheel speed signals, since a power spectrum level of vibration frequency components of a driven wheel tire is greatly changed in accordance with the vehicle running conditions such as the vehicle speed or the like.

In this way, the tire air pressures can be estimated accurately regardless of the vehicle running conditions or whether the wheel is a drive wheel or a driven wheel.

Alternatively, a tire air pressure estimating apparatus according to the present invention may comprise an extracting device for extracting a plurality of tire resonance frequencies or a plurality of tire spring constants from tire vibration frequency components included in a wheel speed signal with respect to each wheel, a selecting device for selecting a tire resonance frequency or tire spring constant used in estimating tire air pressure among the plurality of tire resonance frequencies or tire spring constants in accordance with a running condition of a vehicle, and a determining device for determining based on the running condition of the vehicle whether the wheel speed signals are suitable for estimating the tire air pressure based on the resonance frequency or spring constant extracted therefrom and selected by the selecting device.

The inventors found from their study that the wheel speed signal of a driven wheel includes a higher-order resonance frequency which greatly changes in response to the change of tire air pressure even after a running speed of the vehicle reaches a high speed range, when the vehicle is in one of predetermined running conditions. Therefore, the tire air pressure of the driven wheel can be estimated based on the vibration frequency components containing such a resonance frequency, in the similar manner with the drive wheel.

That is the tire air pressure of a drive wheel is basically estimated all the time based on the resonance frequency or spring constant selected by the selecting device, because the plurality of resonance frequencies or spring constants extracted with respect to the drive wheel is not considerably influenced by the vehicle running conditions such as the vehicle speed or the like.

To the contrary, the tire air pressure of a driven wheel is estimated based on the resonance frequency or spring constant extracted from the wheel speed signal detected when the vehicle is in one of the predetermined running conditions. For example, a condition in which braking force is operated on a vehicle is detected as one of the predetermined running conditions. The tire air pressure of the driven wheel is estimated based on the resonance frequency or spring constant extracted from the wheel speed signal detected during the braking operation of the vehicle.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 4 is a flowchart showing a processing flow in respect of a drive wheel according to the first embodiment;

FIG. 11A is a characteristic diagram indicating change in a ratio of left and right wheel speeds in respect of the vehicle body speed in the driven wheel;

FIG. 11B is a characteristic diagram indicating change in a ratio of left and right wheel speeds in respect of the vehicle body speed in the drive wheel;

FIG. 12 is a flowchart showing a processing flow for the drive wheel when an initializing switch is turned on;

FIG. 13 is a flowchart showing a processing flow for the driven wheel when the initializing switch is turned on;

FIG. 21 is a flowchart showing a processing flow according to a fourth embodiment;

FIG. 22 is a characteristic diagram showing power spectra of a wheel speed signal of a driven wheel when a stop switch is turned on;

FIG. 23 is a flowchart showing a processing flow according to a fifth embodiment;

DETAILED DESCRIPTION OF PREFERRED EMBODIMENT

An explanation will be given of preferred embodiments according to the present invention in reference to the drawings.

[First Embodiment]

Figure 1:
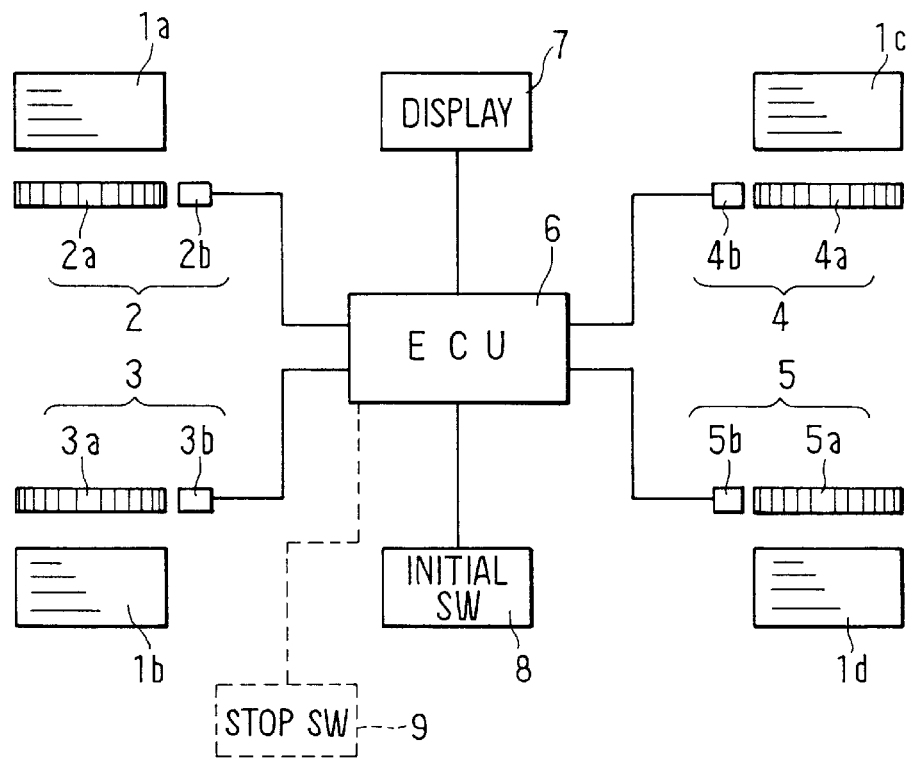
FIG. 1 is a model diagram showing a whole structure of a tire air pressure estimating device according to a first embodiment of the present invention.
Figure 2:
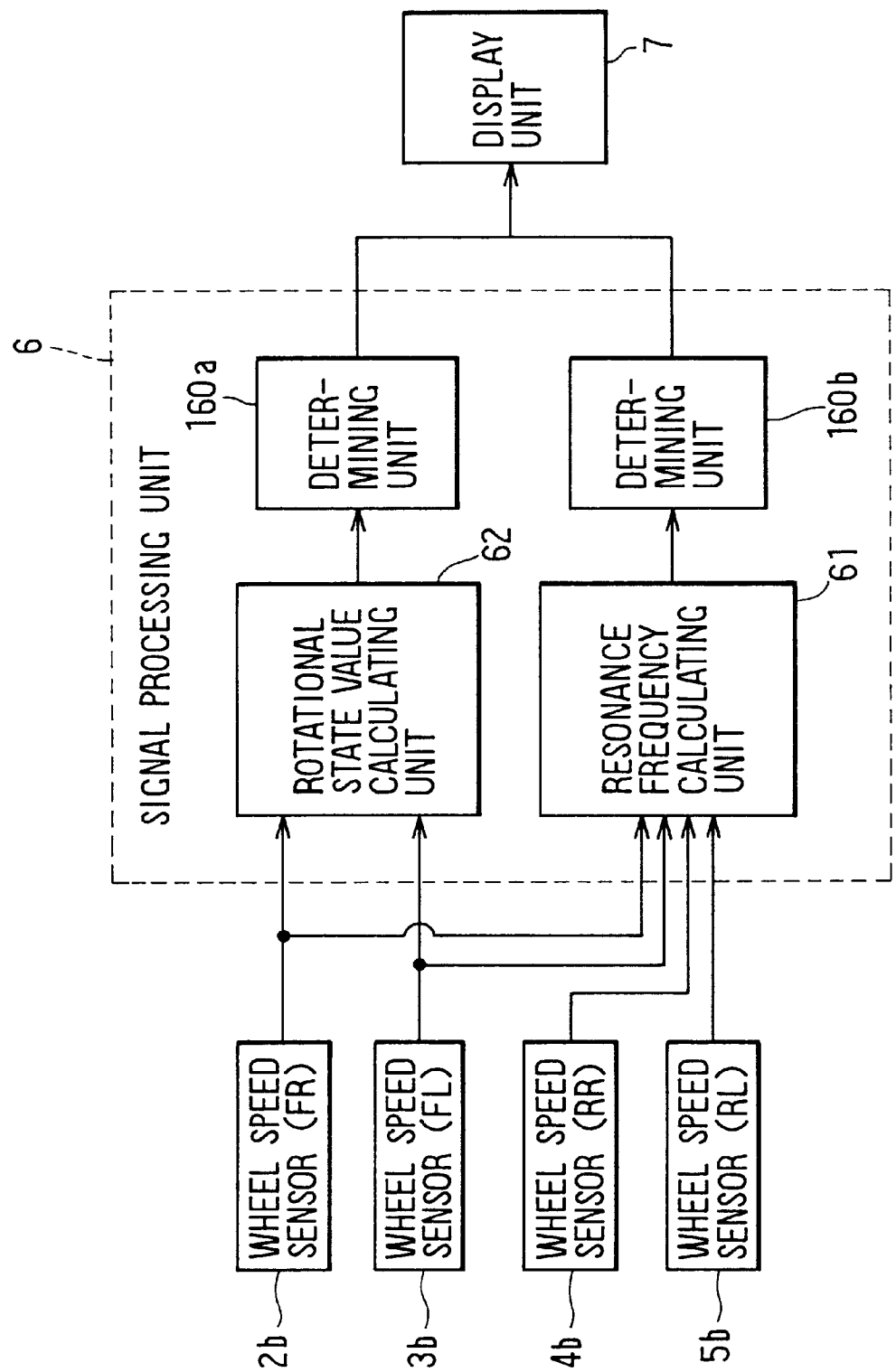
FIG. 2 is a block diagram showing a whole structure of the tire air pressure estimating apparatus according to the first embodiment.

FIGS. 1 and 2 show a tire air pressure estimating apparatus according to the first embodiment of the present invention.

As shown by FIGS. 1 and 2, wheel speed sensors 2 through 5 are installed to respective tires 1a through 1d of a vehicle. The respective wheel speed sensors 2 through 5 are composed of rotors 2a through 5a and pick-up coils 2b through 5b. The rotors 2a through 5a are coaxially mounted on a rotary shaft (not illustrated) of each of the tires 1a through 1d to rotate along with the respective tires 1a through 1d, and are made from disc-shaped magnetic bodies. The pick-up coils 2b through 5b output alternating current signals respectively in correspondence with rotational speeds of the rotors 2a through 5a, that is, the tires 1a through 1d.

The alternating current signals output from the pick-up coils 2b through 5b are fed to a known electronic control device (hereinafter, referred to as ECU) 6 having a waveform shaping circuit and a microcomputer comprising CPU, ROM, RAM and so on so that predetermined signal processing, which includes waveform shaping of the alternating current signals output from the pick-up coils 2b through 5b, is carried out.

The result of the signal processing is provided to a display unit 7 which indicates air pressure states of the respective tires 1a through 1d to a driver. The display unit 7 may display the air pressure states of the respective tires 1a through 1d independently from each other or, by providing only one alarm lamp, it may inform the driver that air pressure of any one of the tires becomes lower than a reference air pressure.

It is to be noted that numeral 8 in FIG. 1 designates an initializing switch for initializing a detection result and the like stored for estimating tire air pressure before.

Next, an explanation will be given of details of signal processing executed in the ECU 6.

First, an explanation will be given of basic principle of estimating a resonance frequency based on a wheel speed signal which is carried out in a resonance frequency calculating unit 61 of the ECU 6 in FIG. 2. Numeral 62 designates a rotational state value calculating unit for calculating wheel speeds of respective wheels by receiving signals from respective wheel speed sensors 2 through 5. Also, a determining unit 160a is for determining tire air pressures of driven wheels by comparing wheel speeds of respective driven wheels which are the rotational state values. A determining unit 160b is for determining tire air pressures of all wheels based on corresponding resonance frequencies.

Figure 3:
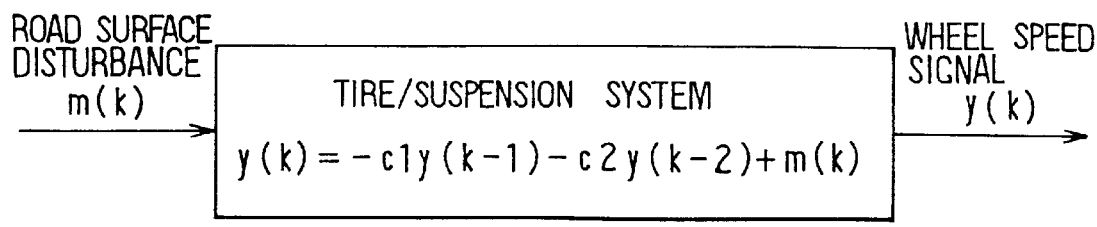
FIG. 3 is a block diagram representing a physical model used for estimating tire air pressure.

A physical model in estimating tire air pressure can be expressed as shown in FIG. 3.

That is, road surface disturbance m(k) that is white noises is applied as an input to the tire/suspension system. As a result, a wheel speed signal y(k) includes resonance frequency components dependent on the tire air pressure.

In the tire air pressure-estimating apparatus in accordance with the first embodiment, the tire/suspension system is approximated by a linear forecasting model. The parameters of the model are identified by the least squares method. Assuming that there exists one resonant point dependent on the air pressure for each tire, it is sufficient that this linear forecasting model be approximated up to the "second" order. This can minimize the amount of calculation and the capacity of data memory (RAM) necessary for the ECU 6.

A second-order discrete time model can be given by $$y(k) = -c1y(k-1) - c2y(k-2) + m(k) \quad (1)$$

where k is a sampling time, m(k) is road surface disturbance, and y(k) is the wheel speed signal as described above.

The unknown parameters c1 and c2 are identified, using finite number of observed data items y(k). In this example, these unknown parameters c1 and c2 are identified by the least squares method.

More specifically, let $\theta$ be a parameter vector. Let z be an observed value vector. We define the following two-dimensional vectors:

$$\theta = \begin{pmatrix} -c1 \\ -c2 \end{pmatrix} \quad (2)$$

Thus, Eq. (1) can be rewritten as $$z(k) = \begin{pmatrix} y(k-1) \\ y(k-2) \end{pmatrix} \quad (3)$$

$$y(k) = Z^T(k)\theta + m(k) \quad (4)$$

As mentioned previously, m(k) in Eq. (4) is the road surface disturbance and can be regarded as white noises. Estimation of the unknown parameters by the least squares method is made by finding such a value of Eq. (2) that minimizes a performance function represented by $$J = \sum_{k=1}^{N} m^2(k) \quad (5)$$

According to the batch-type least squares method, the estimated value of Eq. (2) that minimizes Eq. (5) can be given by $$\hat{\theta} = \left[\sum_{k=1}^{N} z(k) z^T(k)\right]^{-1} \sum_{k=1}^{N} z(k) y(k) \quad (6)$$

For example, see "Introduction to Robust Adaptation Control", by Mikio Kanai, Ohm Publishing Company, and "Introduction to System Identification", System Control Information Library 9, by Toru Katayama, Asakura Publishing Company.

The resonance frequency $\omega$ is found from the c1 and c2 identified in this way.

Letting T be the sampling interval, the relation among the parameters c1 and c2 of the second-order discrete time model, the resonant frequency $\omega$, and an attenuation coefficient $\zeta$ is given by the following Eqs. (7) and (8):

$$c1 = -2c^{2\pi\zeta\omega T}\cos\left(2\pi\omega\sqrt{1-\zeta^2}\,T\right) \quad (7)$$

$$c2 = c^{-4\pi\zeta\omega T} \quad (8)$$

Therefore, the resonance frequency $\omega$ and the attenuation coefficient $\zeta$ can be computed, using the following Eqs. (9) and (10):

$$\omega = \frac{1}{2\pi T}\sqrt{\left(\frac{\log c2}{2}\right)^2 + \left(\cos^{-1}\left(-\frac{c1}{2\sqrt{c2}}\right)\right)^2} \quad (9)$$

$$\zeta = -\frac{1}{4\pi\omega T}\log c2 \quad (10)$$

A description will be given of contents of a processing flow executed by the ECU 6 in the first embodiment in reference to the flowcharts of FIGS. 4, 5, 12 and 13. According to the first through the third embodiments mentioned below, the ECU 6 executes the different processing flows in respect of a driven wheel and a drive wheel among the respective tires 1a through 1d.

FIG. 4 is a flowchart showing contents of processing with respect to a drive wheel.

First, when an ignition switch of a vehicle is turned on, the processing proceeds to step 10 and it is determined whether the initializing switch 8 shown in FIG. 1 is turned on.

A simple explanation will be given of the function of the initializing switch 8.

A tire resonance frequency or tire spring constant which is used to estimate tire air pressure in the first embodiment, is influenced by tire size and category. Therefore, when tires are changed, determination values for determining that tire air pressures lower need to be initialized and updated.

In the following, a case in which the initializing switch 8 is not brought into an ON-state, that is, the determination values for determining lowering of tire air pressure have already been established will be described. The processing of when the initializing switch 8 is determined to be in the ON-state will be mentioned later.

First, at step 100, a pulse signal produced by wave-shaping an alternating current signal outputted from the pick-up coil 4b, 5b is read in. The pulse length of the pulse signal is divided by its pulse duration. In this way, wheel speeds Vx of the drive wheels are calculated for respective wheels independently from each other.

As illustrated in the flowchart, the tire resonance frequency or tire spring constant is calculated based on the linear forecasting method. However, as described in JP-A-7-21723, it is known that the resonance vibration of a tire has the following features.

Figure 6:
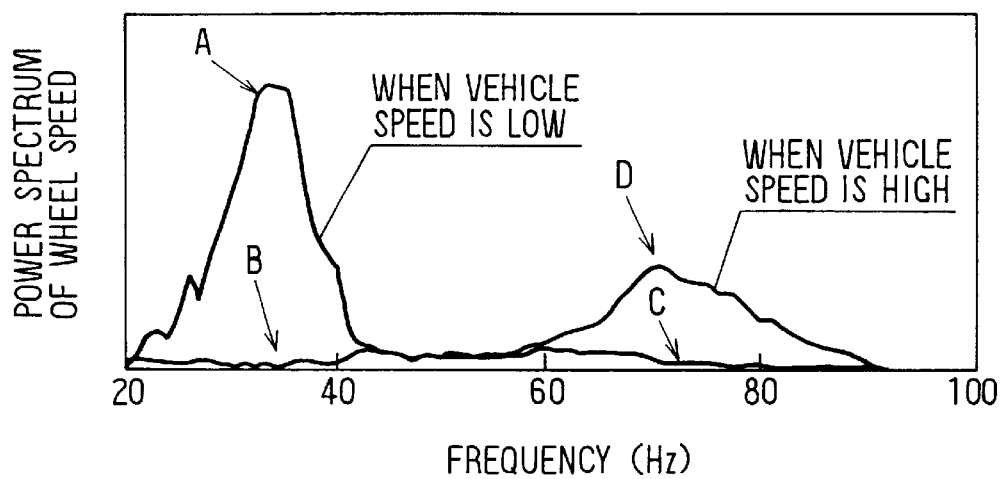
FIG. 6 is a characteristic diagram showing power spectra of wheel speed signals with respect to high and low vehicle body speeds.

That is, in a low through middle vehicle speed range like when a vehicle runs in an urban district, a resonance peak is present in a range of about 30 through 50 Hz in a power spectrum of a wheel speed signal with regard to respective frequencies, as shown by an arrow A in FIG. 6.

However, as the vehicle running speed shifts to a high speed range, as shown by an arrow B in FIG. 6, the resonance peak is gradually decreased. Therefore, the resonance peak in the range of 30 HZ through 50 Hz cannot be used for estimating the tire air pressure.

At this time, as shown by an arrow D in FIG. 6, a new resonance peak emerges at about 60 Hz through 90 Hz. In other words, the resonance peak in the range of 60–90 Hz has a relationship of head and tail of coin with regard to the resonance peak in the range of 30–50 Hz. As shown by an arrow C in FIG. 6, the resonance peak in the range of 60–90 Hz is not clear in the low through middle running speed range where the resonance peak in the range of 30–50 Hz is present.

It is considered that the above-described first resonance peak (in the range of 30–50 Hz) is a torsional resonance frequency in the rotational direction of a tire and the second resonance peak (in the range of 60–90 Hz) is secondary components of the torsional resonance frequency. When tire air pressure lowers, because elastic deformation is increased at a side wall portion of the tire, the spring constant in the torsional direction is also changed. Both of the resonance peaks can be used for estimating the tire air pressure since these have dependency on the tire air pressure.

Figure 7:
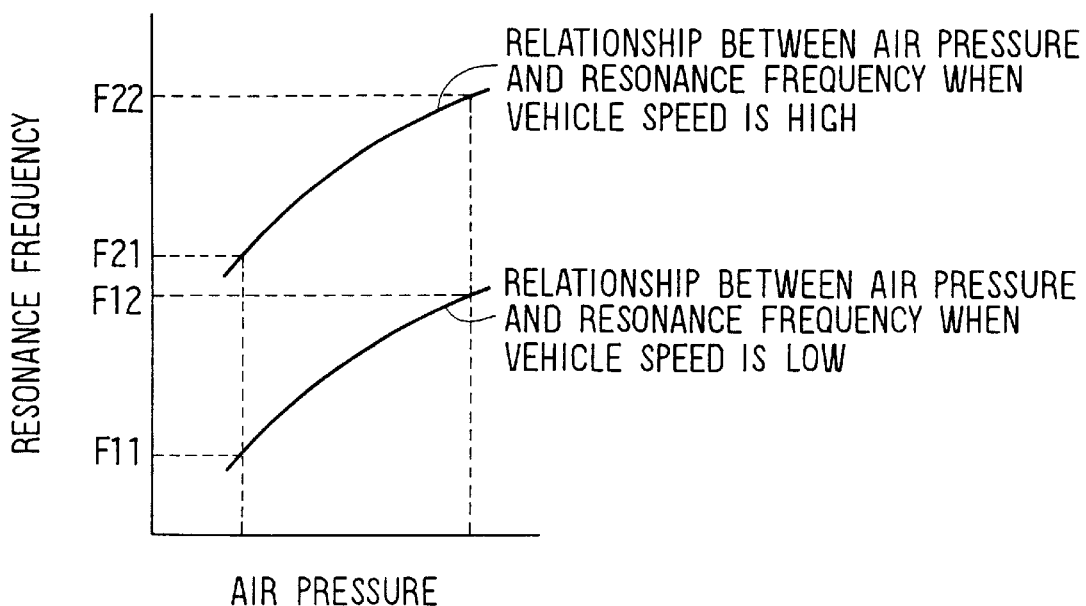
FIG. 7 is a characteristic diagram showing relationships between resonance frequency and tire air pressure with respect to high and low vehicle speeds.

FIG. 7 shows relationships between the first resonance peak (in the range of 30–50 Hz) and tire air pressure as well as the second resonance peak (in the range of 60–90 Hz) and tire air pressure.

At step 110, it is determined whether the vehicle speed V is equal to or less than a predetermined speed Vo, to enable the estimation of the tire air pressure by the resonance frequency included in the wheel speed signal regardless of vehicle running speed, because the first resonance peak and the second resonance peak have the relationship as described above.

When the vehicle speed V is determined to be smaller than the predetermined speed Vo1, that is, when the vehicle running speed falls in a low through middle speed range, the processing proceeds to step 120. At step 120, filter processing is carried out so that signals of frequencies other than frequencies including the first resonance peak are cut off to further intensify signal intensity of the first resonance peak. Therefore, a narrow band pass filter (hereinafter, referred to as band pass filter) having a predetermined frequency pass bang (from F11 through F12) is used. As shown in FIG. 7, reference frequencies F11, F22 are in a relationship of F11<F12<F21<F22.

The wheel speed signal which has passed through the band pass filter is the wheel speed signal y (k) in Eq. (1).

At step 130, parameter identifying processing is carried out for identifying the parameters c1 and c2 of the discrete time model based on Eq. (6) from the wheel speed signal y (k) produced by the band pass filter portion at step 120.

In a resonance frequency converting portion at step 140, the resonance frequency $\omega$ is calculated by Eq. (9) based on parameters c1 and c2 identified at step 130.

Figure 8:
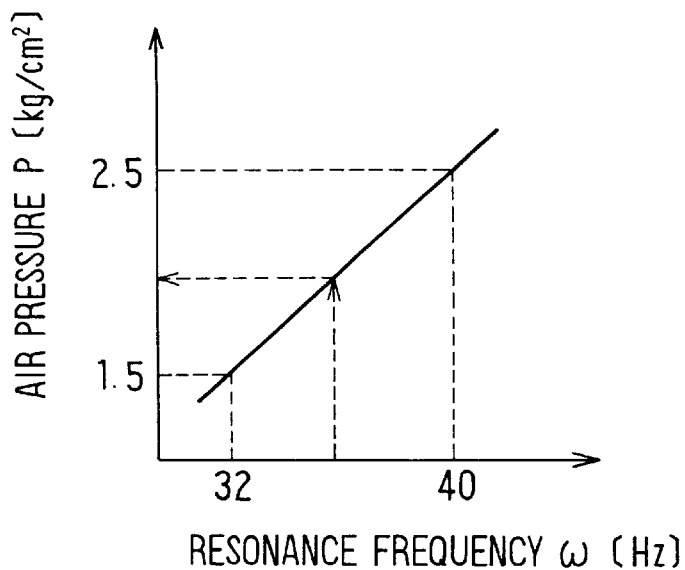
FIG. 8 is a graph showing a relationship between the resonance frequency and tire air pressure.

A resonance frequency—tire air pressure converting portion at step 150 is for converting the calculated resonance frequency $\omega$ into tire air pressure. As mentioned above, the higher the tire air pressure, the higher the resonance frequency. Conversely, the lower the tire air pressure, the lower the resonance frequency. Hence, a relationship between tire air pressure and resonance frequency, provided in a map used at step 150 is exemplified in FIG. 8. That is, the relationship is provided previously as a table (map) and tire air pressure p is directly estimated from a value of the resonance frequency $\omega$ which has been calculated as mentioned above. The tire air pressure estimated value p calculated from the value of the resonance frequency $\omega$ is output to a determining portion of step 160.

At step 160, the determining portion independently determines abnormality of tire air pressure with respect to the respective wheels by comparing the determination values preset as threshold values for determining abnormality of tire air pressure with the tire air pressures p output at step 150.

When the tire air pressure p output at step 150 is lower than the determination value, the ECU 6 drives a displaying portion 7 to indicate abnormality of tire air pressure at step 170. In the displaying portion 7, a lamp is lighted on by a drive signal from the ECU 6 and abnormality of tire air pressure is informed to a driver. It is to be noted that, abnormality of tire air pressure with respect to four wheels may be independently displayed by four lamps or may be displayed by a single lamp, by which abnormality of any tires is informed.

Figure 9:
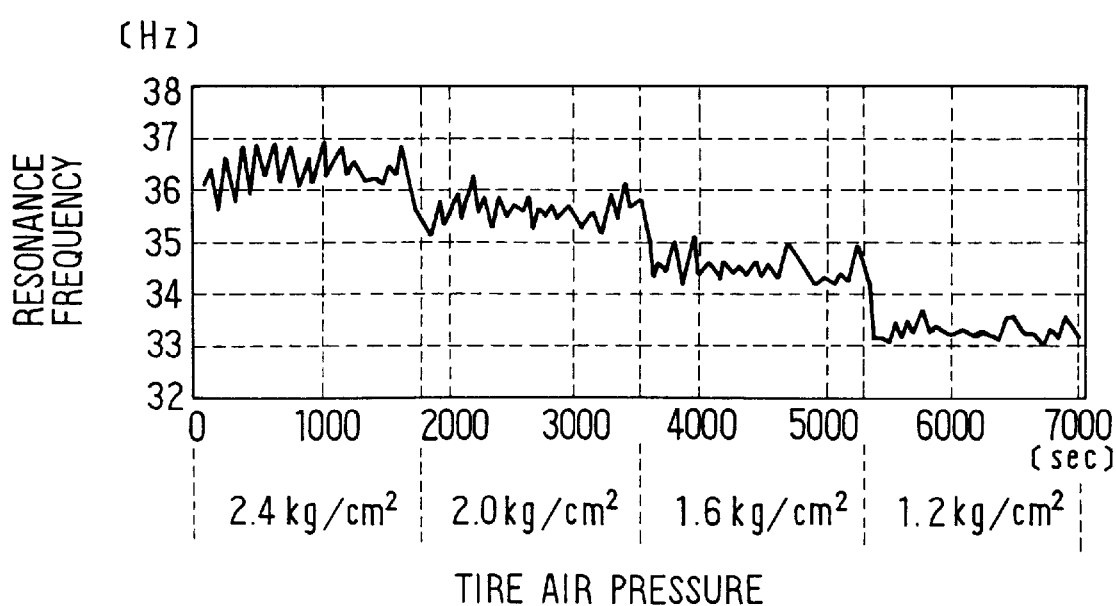
FIG. 9 is a waveform diagram showing a relationship between the resonance frequency and tire air pressure when the resonance frequency is calculated by carrying out frequency analysis on the wheel speed signal.

FIG. 9 shows a result of calculating tire resonance frequencies by the tire air pressure estimating apparatus according to the first embodiment. It can be read from FIG. 9 that the estimated tire resonance frequency is changed substantially linearly in respect of tire air pressure.

When the vehicle speed V is determined to be larger than the vehicle speed Vo1, that is, when the vehicle speed V falls in a high speed range, the processing proceeds to step 220. At step 220, a band pass filter having a predetermined frequency pass band (from F21 to F22) is used for cutting signals of frequency bands other than a frequency band including the second resonance peak in order to further intensify the signal intensity of the second resonance peak (in the range of 60–90 Hz).

The following processing (steps 230 through 260) is the same as that of steps 130 through 160 with respect to the first resonance peak (in the range of 30–50 Hz). Accordingly, an explanation thereof will be omitted.

Therefore, according to the tire air pressure estimating apparatus of the first embodiment, natural air leakage where tire air pressure is lowered substantially simultaneously in four wheels or air pressure lowing of a tire due to puncture caused by stepping on nails can be detected with high reliability, in a wide range of vehicle speed where the vehicle is actually used.

Next, an explanation will be given of a processing flow executed for driven wheels in reference to FIG. 5.

First, before explaining the flowchart of FIG. 5, an explanation will be given of results of detailed investigation made by the inventors with respect to the feature of the second resonance peak (in the range of 60–90 Hz) in reference to FIGS. 10A and 10B.

Figure 10A:
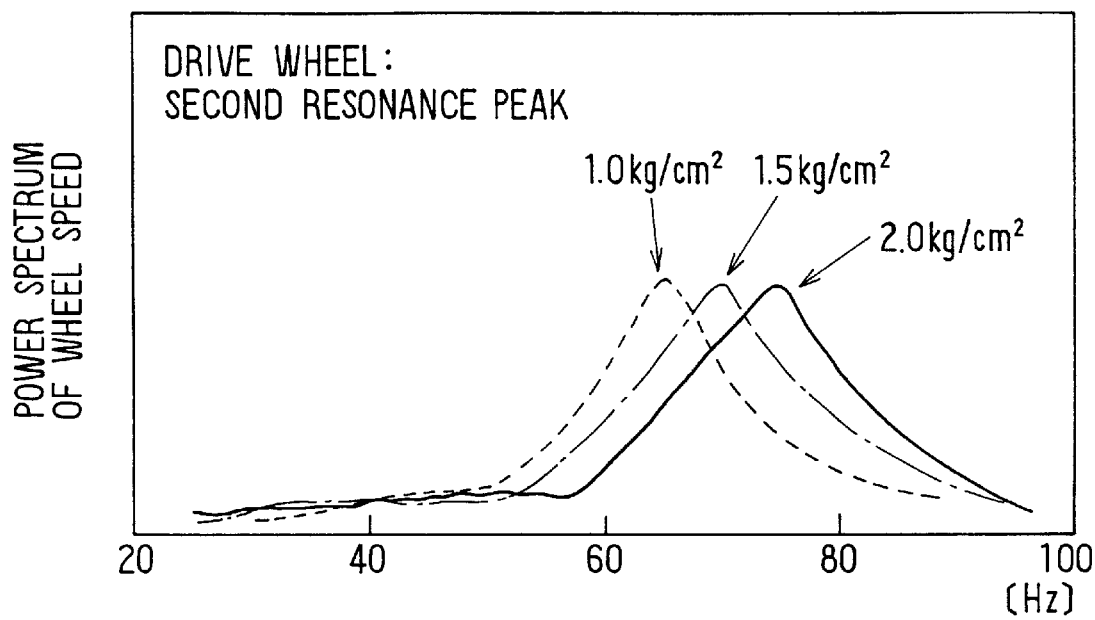
FIG. 10A is a characteristic diagram indicating change of a second resonance frequency peak in accordance with tire air pressure in a drive wheel.
Figure 10B:
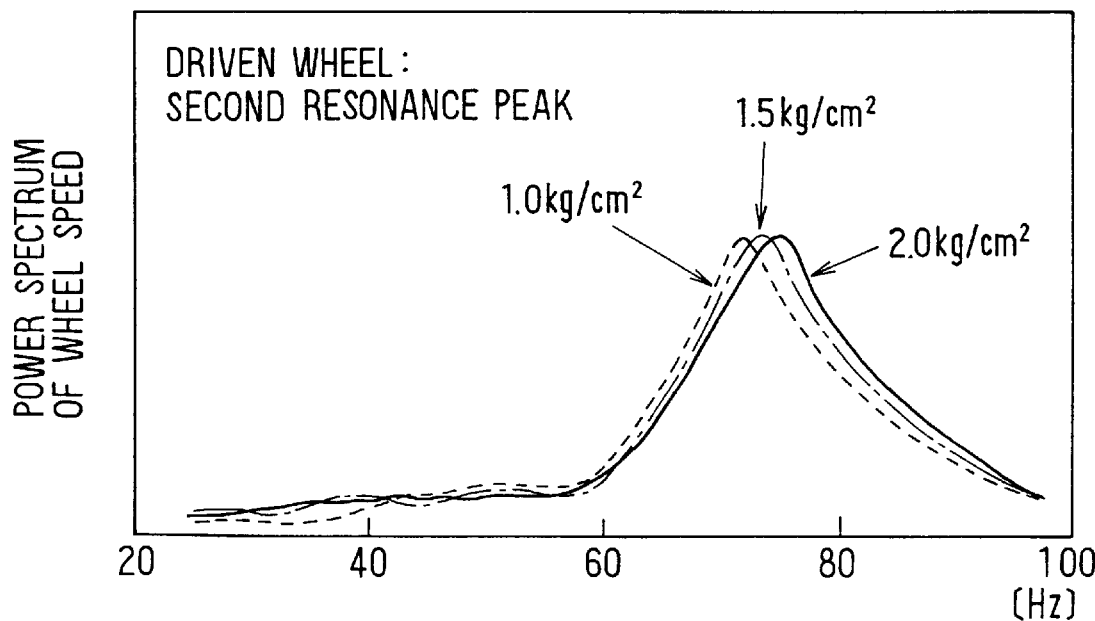
FIG. 10B is a characteristic diagram indicating change of a second resonance frequency peak in accordance with tire air pressure in a driven wheel.

FIGS. 10A and 10B show the changes of the second resonance peaks with respect to a drive wheel and a driven wheel when tire air pressure is used as a parameter. As is apparent from the drawings, although the change of the second resonance peak for the change in the tire air pressure is so large in a drive wheel that the second resonance peak can be used for estimating the tire air pressure, in a driven wheel, the change of the second resonance peak is very small. It has been clarified by research of the inventors that it is considerably difficult for the second frequency peak to be used for estimation of the tire air pressure of the driven wheel in consideration of a dispersion caused by vehicle running conditions or the like.

A tendency that a rate of the change of the second resonance peak to the change in the tire air pressure is significant in a drive wheel and inconsiderable in a driven wheel, has been confirmed by the inventors on a rear wheel drive vehicle, a front wheel drive vehicle and a four wheel drive vehicle. Since it has found that such a tendency is present in any of the vehicles, the phenomena that the wheel speed signal of the drive wheel includes the second resonance peak strongly depending on the change in the tire air pressure and the wheel speed signal of the driven wheel includes the second resonance peak weakly depending on the change in the tire air pressure, seems to be universal. The cause thereof can be considered that, considering a state where a tire is in contact with a road in the high speed range, because driving force is always operated between the road and the tire of the drive wheel, the tread portion on an outer peripheral surface of the tire is stably in contact with the road, whereby the change in the second resonance peak for the change in the air pressure manifestly appears.

As disclosed in Japanese Examined Patent Publication No. JP-B-5-55332, there have been proposed many tire air pressure estimating apparatuses in which rotational state values of respective tires (values produced by integrating wheel speed, wheel angular velocity, rotational pulse number and so on for a constant time period) are calculated based on wheel speed signals detected with respect to the respective wheels, and puncture in which air pressure of one wheel is lowered is alarmed from a relative relationship among the rotational state values of the respective tires. The basic principle capable of determining lowering of air pressure caused by puncture or the like using the rotational state values resides in the fact that a tire rubber portion of a wheel where tire air pressure is lowered deflects owing to load of the vehicle more than that of a wheel having a normal tire air pressure. As a result, a distance between a rotational center of the tire (center of a wheel) and the road surface is shortened. In this way, because the effective rotation radius of the tire is reduced, the tire rotational state value (value integrating a wheel speed, wheel angular velocity, rotational pulse number and so on for a constant time period) is increased more than that of the other wheel of which tire air pressure is normal. Accordingly, the lowering of the tire air pressure can be detected by comparing the tire rotational state values.

The inventors have clarified advantages and disadvantages of a method of determining lowering of tire air pressure using the tire rotational state values through the detailed investigation of detection mechanism. FIG. 5 shows the processing flow of the ECU 6 by which lowering of tire air pressure of the driven wheel can be determined in a wide range of vehicle speed where a vehicle is actually used, by utilizing the advantages of the method against the problem such that tire air pressure of a driven wheel is difficult to estimate based on the second resonance peak (in the range of 60–90 Hz).

An explanation will be given of the advantages and the disadvantages of the method using the tire rotational state values in reference to FIGS. 11A and 11B. In FIGS. 11A and 11B, ratios of rotational state values of respective tires of driven wheels and the drive wheels in a rear wheel drive vehicle, that is, ratios of wheel speeds of front left and front right wheels and of rear left and rear right wheels (FR: front right wheel, FL: front left wheel, RR: rear right wheel, RL: rear left wheel) are plotted. In this case, the front and rear right wheels are brought under normal pressure (for example, 2.0 kg/cm$^2$) and air pressures of the front and rear left wheels are set to 2.0 kg/cm$^2$, 1.6 kg/cm$^2$, and 1.2 kg/cm$^2$.

According to the graph indicating the case of the driven wheels (FR/FL), a ratio of speeds of left and right wheels (FR/FL) is changed by lowering of tire air pressure of the left front wheel (FL), and is stabilized without being influenced by the change of vehicle speed. In such a state, lowering of tire air pressure can be determined based on the ratio of the wheel speeds.

To the contrary, according to the graph indicating the case of the drive wheels (RR/RL), when the tire air pressure of the left rear wheel (RL) lowers, the ratio of speeds of the left and right wheels (RR/RL) shows a characteristic in which the ratio is clearly changed by lowering of tire air pressure in a relatively low vehicle speed region within a high vehicle speed range, however, the faster the vehicle speed, the less the ratio is changed regardless of lowering of tire air pressure of the rear left wheel (RL).

The cause of such a phenomenon is considered as follows. It is thought that, in a high vehicle speed range where air pressure resistance of a tire is balanced with vehicle speed, forward-moving force of the vehicle is maintained to a high state, and large driving force is applied on drive wheels. That is, it is thought that slippage occurs in the drive wheels even when tires of both left and right wheels are under normal pressure of 2.0 kg/cm$^2$.

When a slipping state of a rear left wheel of which tire air pressure is lowered is considered, it is well known that when the tire deflects in accordance with lowering of air pressure, an area of the tire in contact with a road surface is increased and thereby traction of the tire recovers, as a result, slippage of the wheel is further difficult to occur than a wheel of which tire air pressure is normal. When the influence of such a slipping state of the wheel on the tire rotational state value (integrated value of wheel speed) as mentioned above is considered, although the integrated value of the wheel speed is increased due to reduction of the effective rotating radius caused by lowering of tire air pressure, the reduction of slippage caused by recovery of the traction operates to cancel increase in the integrated value of the wheel speed.

That is, it means that no constant relationship is established between lowering of tire air pressure and the integrated value of the wheel speed, whereby lowering of tire air pressure is difficult to determine based on the integrated values of the wheel speeds.

According to the tire air pressure estimating apparatus using the rotational state values (integrated values of wheel speed or the like) in JP-B-5-55332 described above, lowering of tire air pressure is determined by comparing the tire rotational state values of four wheels with each other. Therefore, the above-described influence of variation in the rotational state values of the drive wheels is unavoidable. For this reason, the apparatus incorporates a basic problem in which a vehicle speed range capable of detecting lowering of tire air pressure is limited in principle.

Figure 5:
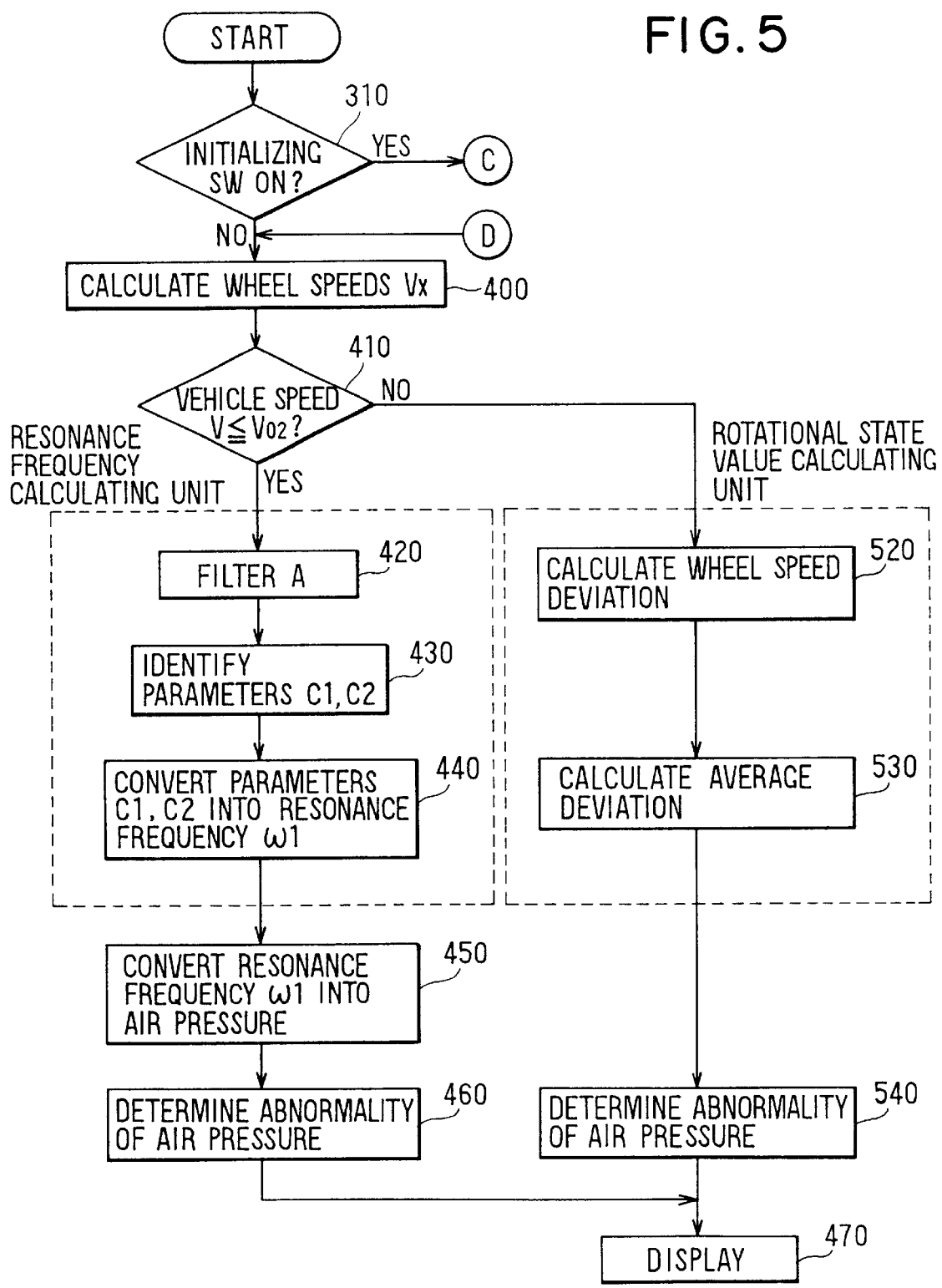
FIG. 5 is a flowchart showing a processing flow in respect of a driven wheel according to the first embodiment.

According to the first embodiment, as shown in a flowchart of FIG. 5, to determine lowering of tire air pressure of a driven wheel of which the tire air pressure is difficult to estimate by the second resonance peak, attention is paid to advantages of the method of determining lowering a tire air pressure using tire rotational state values (integrated value of wheel speed or the like). That is, a ratio of the tire rotational state values of left and right driven wheels is used as a parameter for determining lowering of tire air pressure, based on the fact that, in a driven wheel where driving force is not operated, the tire rotational state value has characteristics suitable for estimation of the tire air pressure in respect of lowering of tire air pressure. As a result, lowering of driven wheel tire air pressure can be determined in a wide range of vehicle speed where a vehicle is actually used.

An explanation will be given of respective steps of the flowchart of FIG. 5.

First, when an ignition switch of a vehicle is turned on, the operation proceeds to step 310.

As has been explained in respect of the drive wheel, the following explanation concerns the case in which the initializing switch 8 is not brought in an ON-state, that is, determination values for determining lowering of driven wheel tire air pressure have already been determined. It is to be noted that processing carried out when the initializing switch 8 is determined to be in the ON-state at step 310 will be described later.

At step 400, a pulse signal produced by wave-shaping an alternating current signal output from the pick-up coil 2b, 3b is read in. The pulse length of the pulse signal is divided by its pulse duration. In this way, the wheel speeds Vx of the driven wheels are calculated independently from each other.

Next, at step 410, it is determined whether a vehicle speed V calculated from the wheel speeds Vx is determined to be equal to or smaller than a predetermined speed Vo2. When the running speed of the vehicle falls in a low through middle speed range, the processing proceeds to step 420. The predetermined speed Vo2 may be the same as the above-described predetermined speed Vo1 or may be different therefrom.

The processing from step 400 to step 470 in FIG. 5 is the same as that from step 100 to step 170 in FIG. 4 which have already been explained. Accordingly, an explanation thereof will be omitted. In the following description, an explanation will be given of processing (steps 520 and 530) carried out when the vehicle speed V calulated at step 410 is more than the predetermined speed Vo2. That is, driven wheel tire air pressure is difficult to estimate using the above-described first resonance peak (in the range of 30–50 Hz) in a high speed range. Therefore, in this case, the method of determining lowering of tire air pressure using the rotational state values of the respective driven wheel tires are utilized.

An explanation will be given of processing at step 520. It is to be noted that a wheel speed integrated value is used as a tire rotational state value. At step 520, a wheel speed deviation D between wheel speeds of the driven wheels is calculated by the following Equation (11), using the wheel speeds Vx which are detected in respect of right side and left side driven wheels. It is to be noted that calculation of the wheel speed deviation D is executed at every period of calculating the wheel speeds, for example, at every 5 ms.

$$D = Vxfr/Vxfl \quad (11)$$

wherein Vxfr is a wheel speed of the right driven wheel and Vxfl is a wheel speed of the left driven wheel.

At step 530, a predetermined number (n) of the wheel speed deviations D calculated as mentioned above is stored in a memory of the ECU 6 and is averaged by the following Equation (12).

$$Do = \sum_{k=1}^{n} D(k)/n \quad (12)$$

The processing at the step 530 is for removing influence of vehicle running situations such as turning or slope ascending/descending to the wheel speeds of the driven wheels, although the driving force is not operated to the driven wheels.

At step 540, the average wheel speed deviation Do is compared with a predetermined reference value, and it is determined that tire air pressure lowers in any one of the driven wheels when the average wheel speed deviation Do exceeds the reference value.

At step 170, a display portion 7 such as a lamp or the like is turned on based on a drive signal from the ECU 6 as has already been explained. As a way of display in this case, four lamps display corresponding to the four wheels can be carried out and display using only one lamp can also be carried out, because it can be determined which of the left wheel tire air pressure and right wheel tire air pressure has lowered since lowering of air pressure is determined by comparing the wheel speeds of the left and right driven wheels.

Figure 12:
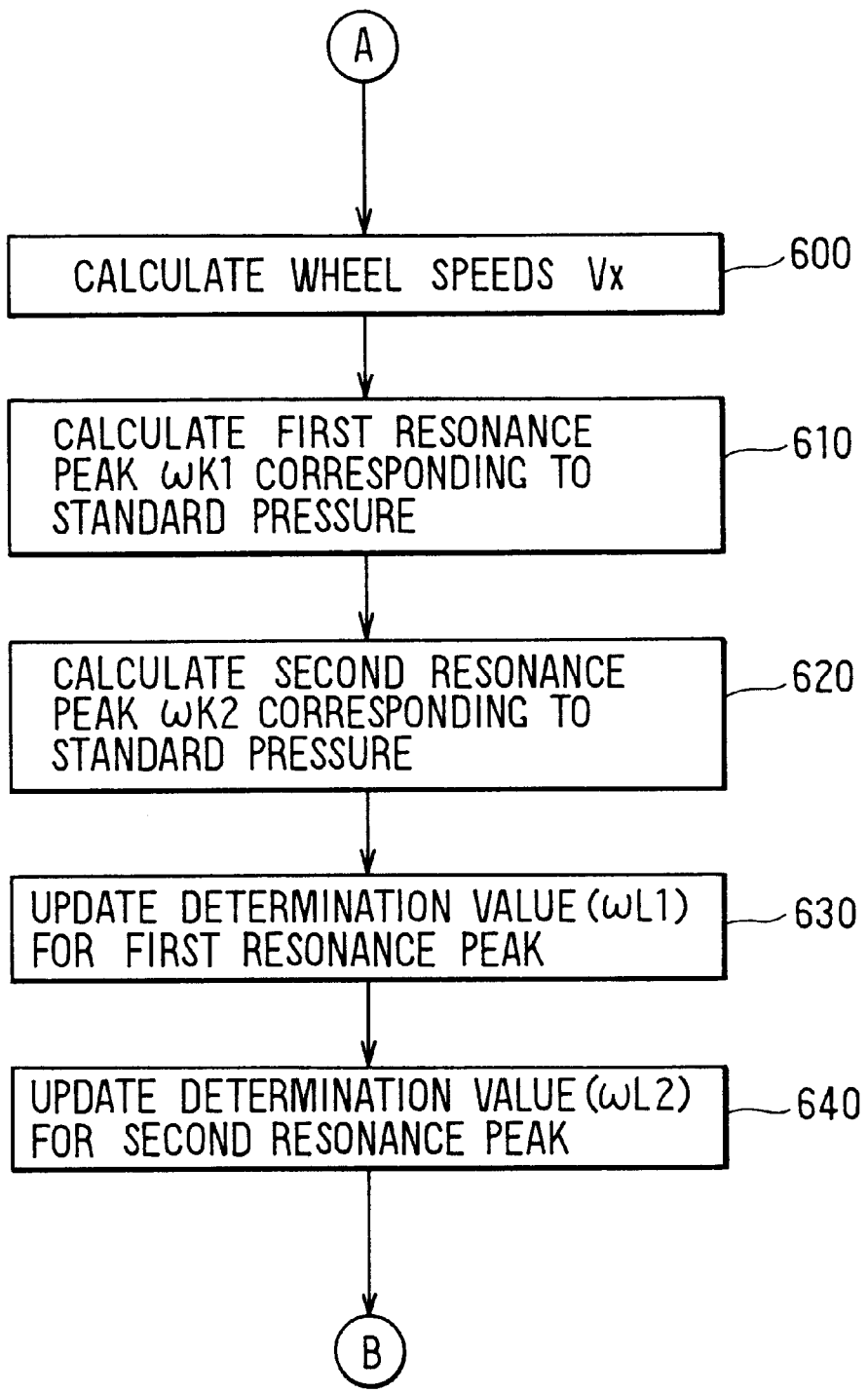
Figure 13:
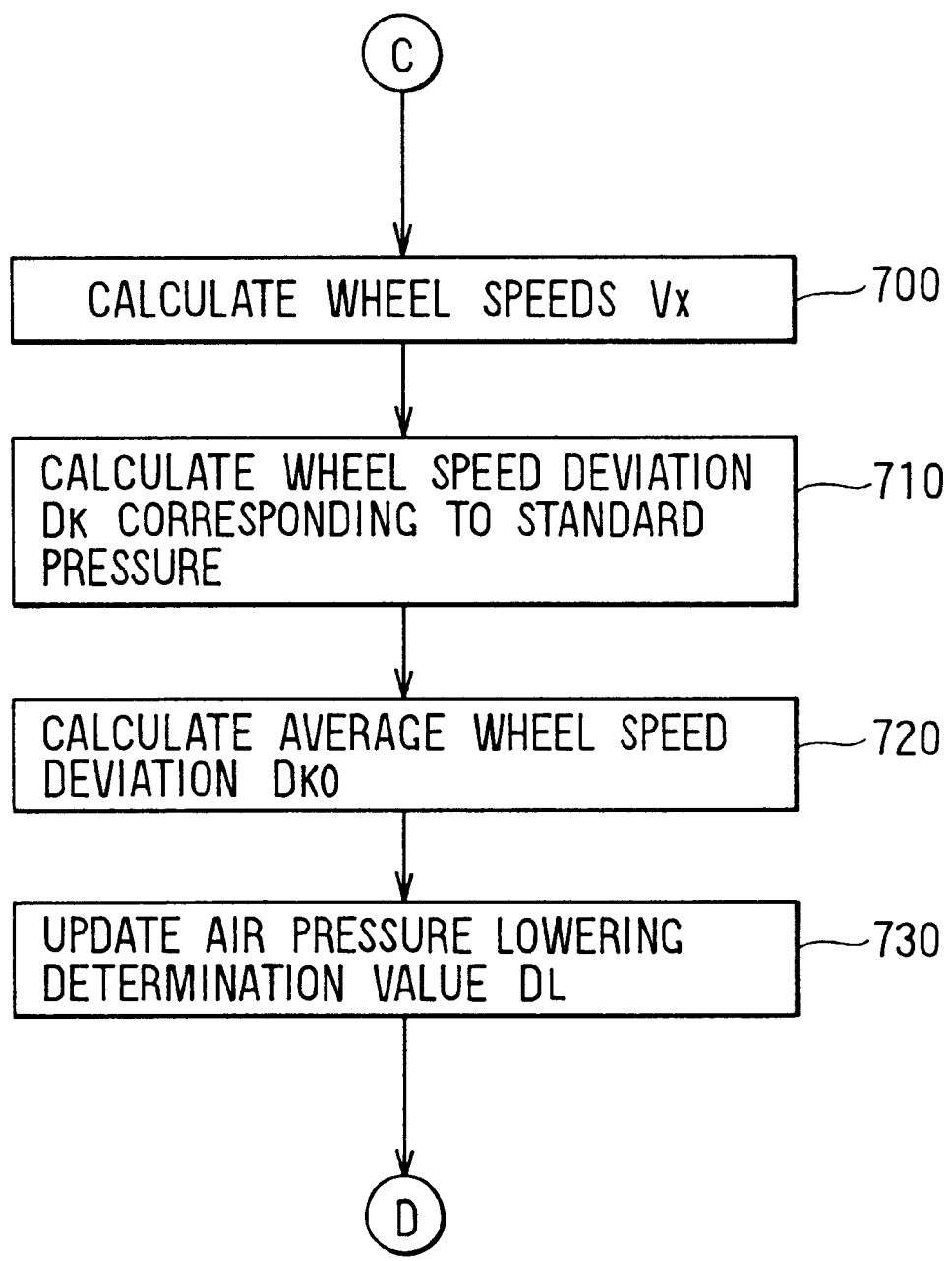

Next, an explanation will be given of the case in which the initializing switch 8 is turned on in reference to FIGS. 12 and 13.

First, an explanation will be given of initialization processing for a drive wheel in reference to FIG. 12.

At step 600, similar to step 100 as described above, an alternating current signal output from the pick-up coil 4b, 5b is wave-shaped to produce a pulse signal which is read in by the ECU 6. The pulse length of the pulse signal is divided by a pulse duration. In this way, the wheel speeds Vx of the drive wheels are calculated independently from each other.

As mentioned above, the initializing switch 8 is provided for determining a relationship between a resonance frequency inherent to a tire and tire air pressure, which is necessary in estimating drive wheel tire air pressure, when at least one of the tires is changed. Therefore, when the initializing switch 8 is turned on, it is necessary that the tire air pressure of the changed tire is set to a predetermined value. For example, the user of the vehicle is required that the tire air pressure of the changed tire is set to a standard air pressure.

At step 610, a resonance frequency (first resonance peak) of the drive wheel tire is calculated and stored as a first resonance peak ωk1 corresponding to the standard tire air pressure into a memory of the ECU 6.

After the first resonance peak ωk1 is calculated at step 610, at step 620, a resonance frequency ωk2 (second resonance peak) of the drive wheel tire is calculated when the tire is under the standard air pressure. Because a physical relationship between the first resonance peak ωk1 and the second resonance peak ωk2 is elucidated, the second resonance peak ωk2 is calculated from the relationship.

At step 630, a resonance frequency ωL1 in correspondence with an alarm pressure is calculated from the following Equation (13) based on the first resonance peak ωk1 corresponding to the standard air pressure. The resonance frequency ωL1 is overwritten in the memory in the ECU 6 to establish a new determination value of determining lowering of drive wheel tire air pressure when the vehicle speed is equal to or less than Vo.

$$\omega L1 = \omega K1 - \Delta \omega 1 \quad (13)$$

wherein $\Delta\omega 1$ is a constant value.

Similarly, at step 640, a determination value $\omega L2$ of determining lowering of drive wheel tire air pressure is calculated from the following equation (14) based on the resonance frequency $\omega K2$ (second resonance peak) calculated at step 620 to enable the determination of lowering of drive wheel tire air pressure when the vehicle speed is more than Vo.

$$\omega L2 = \omega K2 - \Delta \omega 2 \text{ (constant)} \quad (14)$$

Next, an explanation will be given of initialization processing for a driven wheel in reference to FIG. 13.

At step 700, the wheel speeds Vx of the driven wheels are calculated in the similar manner with the drive wheels.

At step 710, a wheel speed deviation Dk corresponding to a standard tire air pressure is calculated by the following Equation(15) on the premise in which a tire air pressure of the changed driven wheel tire is set to the standard air pressure.

$$Dk = Vxfr/Vxfl \quad (15)$$

Wherein Vxfr is a wheel speed of the right driven wheel and Vxfl is a wheel speed of the left driven wheel.

Further, at step 720, the number (n) of the wheel speed deviations Dk calculated by Eq. 15 are added together as shown by Eq. 12, thereby obtaining the average wheel speed deviation Dko. At step 730, tire air pressure lowering determination value DL is calculated based on the average wheel speed deviation Dko and is overwritten in the memory of the ECU 6.

[Second Embodiment]

Figure 14:
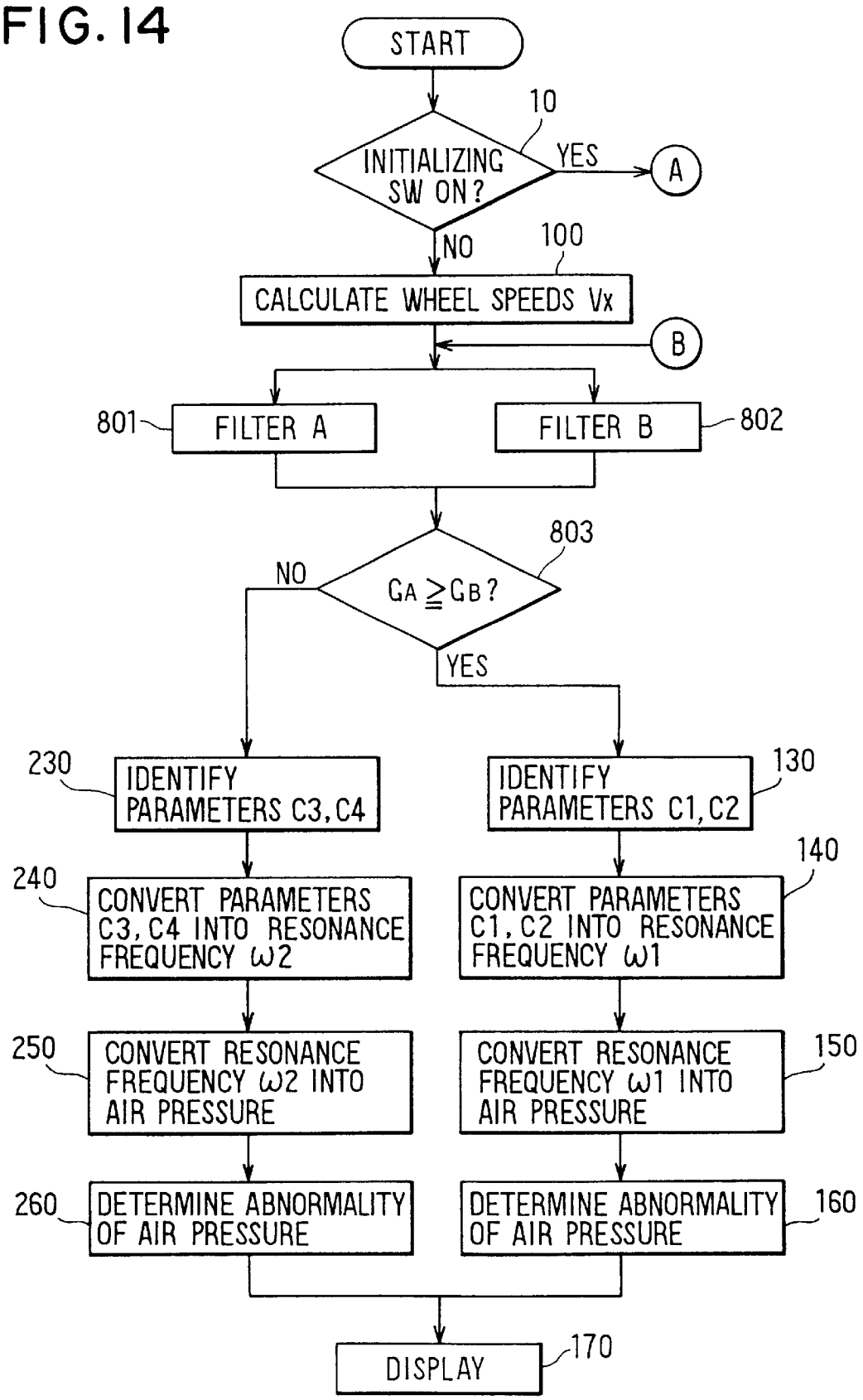
FIG. 14 is a flowchart in respect of a drive wheel according to a second embodiment.

An explanation will be given of a second embodiment in reference to FIGS. 14 and 15.

In the second embodiment, when tire air pressures of drive wheels are estimated based on the corresponding tire resonance frequencies calculated from vibration components of drive wheel speed signals, the frequency ranges of the vibration components are divided in two ranges, and signal intensities in the respective frequency ranges are calculated. The frequency range from which the resonance frequency is extracted is selected based on the signal intensities.

An explanation will be given of the second embodiment in reference to a flowchart of FIG. 14. It is to be noted that the flowchart of FIG. 14 is carried out in respect of drive wheels.

Steps 10 and 100 are the same as those which have been described in the first embodiment, and an explanation thereof will be omitted.

At steps 801 and 802, filter processing is carried out so that signals of frequencies other than frequencies including the first resonance peak (in the range of 30–50 Hz) and the second resonance peak (in the range of 60–90 Hz) are cut off to further intensify signal intensities of the first resonance peak and the second resonance peak. Therefore, band pass filters A and B each having a predetermined frequency pass bands (from F11 to F12 and from F21 to F22 as shown in FIG. 7) are respectively used at steps 801 and 802.

At step 803, signal intensities Ga and Gb of the first resonance peak and the second resonance peak extracted at step 801 are calculated and the magnitudes thereof are compared.

An explanation will be given of a specific method of calculating the signal intensities Ga and Gb in reference to FIG. 18.

Figure 18:
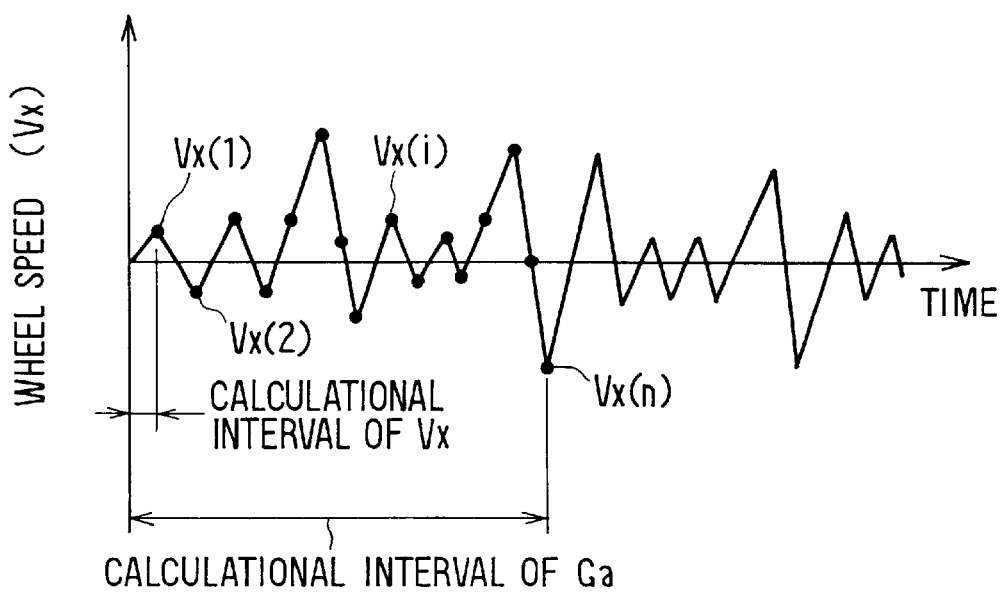
FIG. 18 shows a waveform illustrating calculation results of wheel speed Vx after passing through a C-band pass filter.

FIG. 18 is a waveform of the output from the filter A (step 801) when a wheel speed Vx is filtered. The horizontal axis indicates time. The vertical axis indicates a gain representing the magnitude of the vibration components of the first resonance peak. Let Vx(i) be value of Vx at every calculational interval of 5 ms, for example. The intensity Ga of the first resonance peak can be given by $$Ga = \sum_{i=1}^{n} (Vx(i))^2 \quad (16)$$

That is, it can be expressed as the sum of a number (n) of squares of the Vx(i) calculated at every wheel speed calculational interval.

The signal intensity Gb of the second resonance peak can be calculated in the same manner.

The signal intensities Ga and Gb are compared to each other. When the signal intensity Ga is larger than the signal intensity Gb, the range of the resonance frequency used in estimating drive wheel tire air pressure is determined as the frequency range including the first resonance peak (in the range of 30–50 Hz) and the processing proceeds to step 130.

Step 130 and the following steps are the same as steps 130 through 170 which have already been explained in reference to FIG. 4, and therefore, the description thereof is omitted.

When the signal intensity Gb is larger than the signal intensity Ga, the resonance frequency range used in estimating the drive wheel tire air pressure is determined to be frequency range including the second resonance peak. At this time, step 230 and the following steps are carried out, which are the same as those as mentioned above referring to FIG. 4.

Figure 15:
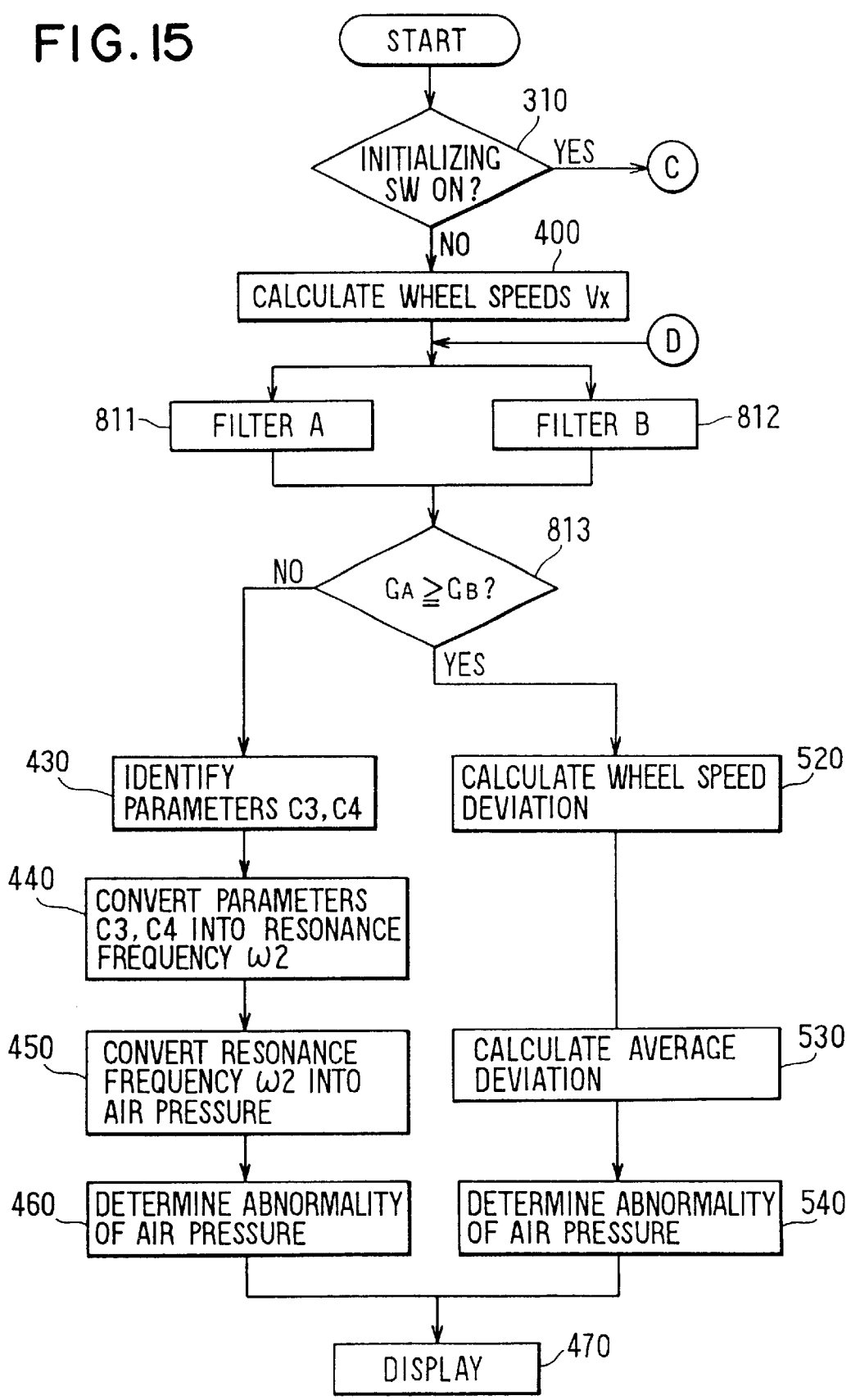
FIG. 15 is a flowchart in respect of a driven wheel according to the second embodiment.

FIG. 15 shows a flowchart carried out in respect of driven wheels.

In the second embodiment, tire air pressures of driven wheels are basically estimated based on the corresponding tire resonance frequencies calculated from vibration components of driven wheel speed signals. However, when a predetermined condition is fulfilled, the tire air pressures of driven wheels are estimated based on the above described tire rotational state values. The following method is adopted to determine that, based on which of the resonance frequencies and the tire rotational state values, the driven wheel tire air pressure is to be estimated. That is, the frequency ranges of the vibration components of the wheel speed signal are divided in two ranges, and signal intensities Ga and Gb in the respective frequency ranges are calculated and compared (steps 811, 812 and 813). When the signal intensity Ga is larger, the driven wheel tire air pressure is estimated based on the resonance frequency (first resonance peak) (steps 430 to 460). To the contrary, when the signal intensity Gb is larger, the driven wheel tire air pressure is estimated based on the tire rotational state values (steps 520 to 540).

[Third Embodiment]

The third embodiment will be explained in referring to FIGS. 16, 17 and 19.

In the third embodiment, when tire air pressures of drive wheels are estimated based on the corresponding tire resonance frequencies calculated from vibration components of drive wheel speed signals, a vibration input intensity is calculated from vibration components of a tire vibration phenomenon caused by vibration input from a road surface. The frequency range from which the resonance, frequency is to be extracted is selected among a plurality of frequency ranges based on the vibration input intensity.

Figure 16:
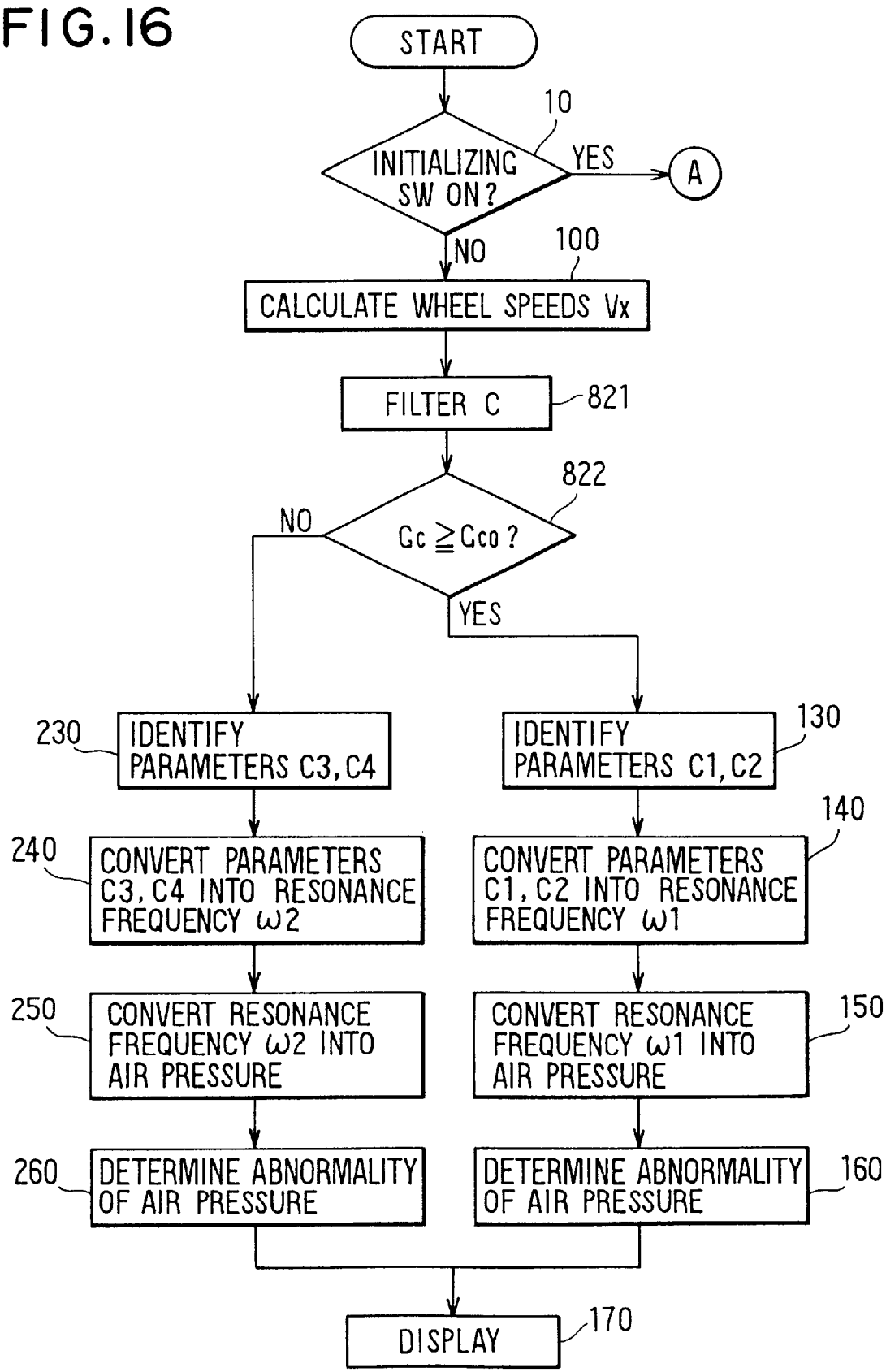
FIG. 16 is a flowchart in respect of a drive wheel according to a third embodiment.

FIG. 16 shows a flowchart carried out in respect of driven wheels. In FIG. 16, since steps 10 and 100 are the same as those in FIG. 4, the description thereof is omitted.

At step 821, a filtering process is carried out so that signals of frequencies other than frequencies including the vibration components of the tire vibration phenomenon caused by vibration input from the road surface, are cut off to further intensify the vibration input signal intensity.

At step 822, the vibration input signal intensity Gc is calculated from the vibration frequency components input from the road surface of which the signal intensity is intensified at step 821, and a magnitude thereof is compared with a predetermined reference value Gco.

An explanation will be given of a specific method of calculating signal intensity Gc in reference to FIG. 19.

Japanese Patent Application Laid-Open No. 6-270618 has already taught that the vibration input from the road surface can be extracted from variation components of the wheel speed signal by using a suitable band pass filter (filter C). The specific method of calculating the vibration input is exemplified in FIG. 19.

Figure 19:
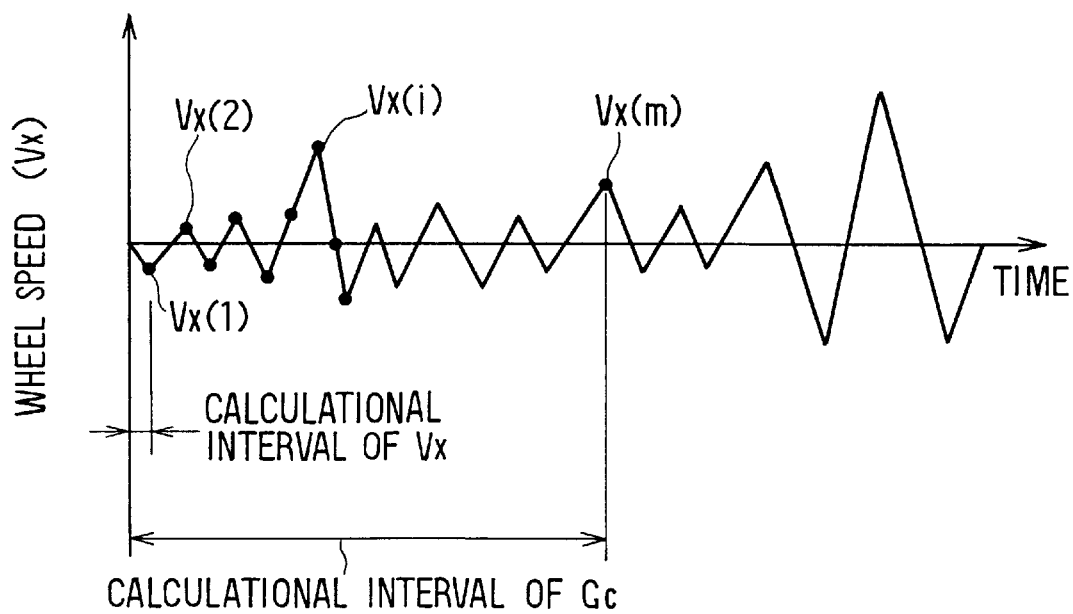
FIG. 19 is a reference characteristic diagram to explaining a specific method of calculating a signal intensity of vibrations given from a road.

FIG. 19 is a waveform diagram of the output from the filter C (step 821) when a wheel speed Vx is filtered. The horizontal axis indicates time. The vertical axis indicates a gain representing the magnitude of the vibration components input from the road surface. Let Vx(i) be the value of Vx at every calculational interval of 5 ms, for example. The signal intensity Gc of the vibration input can be given by $$Gc = \sum_{i=1}^{m} (Vx(i))^2 \tag{17}$$

That is, it can be expressed as the sum of a number (m) of squares of the Vx(i) calculated at every wheel speed calculational interval.

Figure 20:
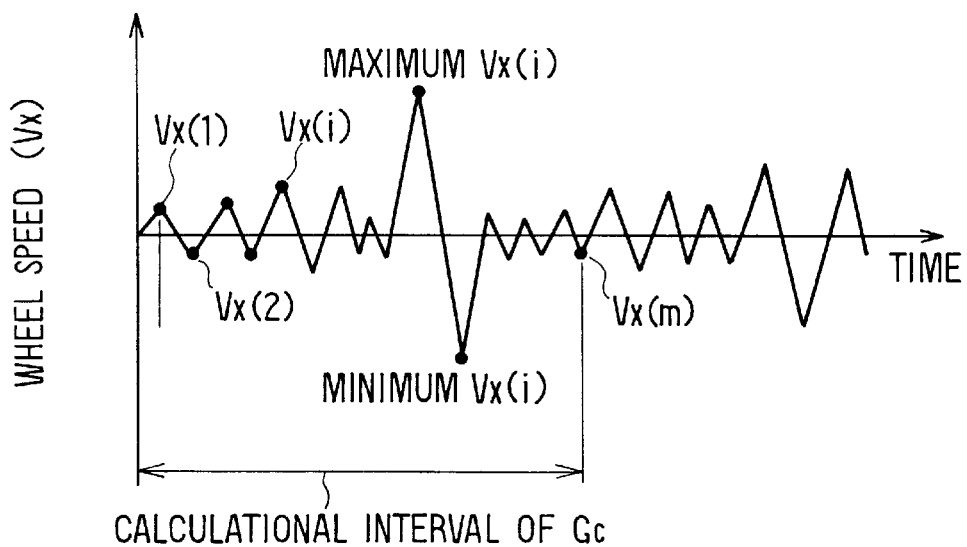
FIG. 20 is a characteristic diagram showing another method of calculating a signal intensity of vibrations given from a road.

FIG. 20 shows another example of the method of calculating the signal intensity of vibration input from the road surface. That is, the sum of the maximum gain (maxVx(i)) and the minimum gain (minVx(i)) of the vibrational components of the wheel speed during the calculational interval of the signal intensity Gc is adopted as a signal intensity Gc. It is to be noted that, when the sum of the maximum gain and the minimum gain is calculated, the absolute value of the maximum gain and the absolute value of the minimum gain are added.

Calculated signal intensity Gc and the predetermined reference value Gco are compared with each other. When the vibration input intensity Gc is larger, the vibration frequency range used in estimating drive wheel tire air pressured is determined to be the frequency range including the first resonance peak (in the range of 30–50 Hz), and the processing proceeds to step 130.

Step 130 and following steps are the game as those in FIG. 4.

When the vibration input intensity Gc is smaller than the reference value Gco, the resonance frequency range used in estimating drive wheel tire air pressure is set to the frequency range including the second resonance peak, and the processing proceeds to step 230. Step 230 and the following steps are the same as those in FIG. 4.

Figure 17:
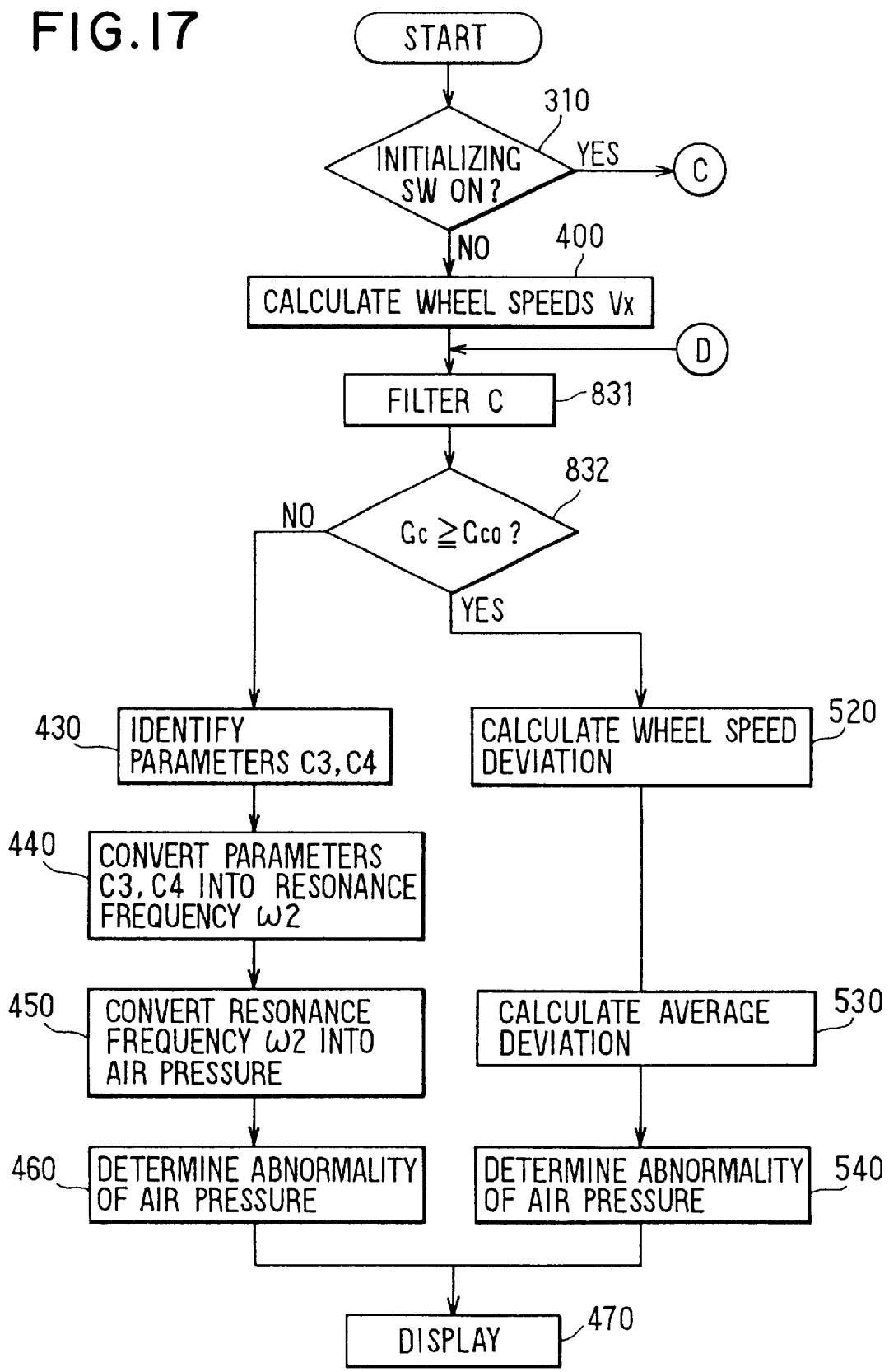
FIG. 17 is a flowchart in respect of a driven wheel according to the third embodiment.

FIG. 17 shows a flowchart carried out in respect of driven wheels.

In the third embodiment, tire air pressures of driven wheels are basically estimated based on the corresponding tire resonance frequencies calculated from vibration components of driven wheel speed signals. However, when a predetermined condition is fulfilled, the tire air pressures of driven wheels are estimated based on the above described tire rotational state values. The following method is adopted to determine that, based on which of the resonance frequencies and the tire rotational state values, the driven wheel tire air pressure is to be estimated. That is, the vibration input signal intensity Gc is calculated from the vibration components of the tire vibration phenomenon caused by the vibration input from the road surface (steps 831 and 832). When the signal intensity Gc is larger, the driven wheel tire air pressure is estimated based on the resonance frequency (first resonance peak) (steps 430 to 460). To the contrary, when the signal intensity Gc is smaller, the driven wheel tire air pressure is estimated based on the tire rotational state values (steps 520 to 540).

The present invention is not limited to the above-described embodiments but can be variously modified as follows.

For example, according to the above-described embodiments, the ECU 6 is constituted such that the processing for the drive wheels and the processing for the driven wheels proceed to the different flows. That is, independent calculating units and determining units which can perform calculation processing for the drive wheel and the driven wheel in parallel are provided. However, the calculation processing may be carried out in the ECU 6 as in the order of right drive wheel→left drive wheel→right driven wheel→left driven wheel. In this case, after it is determined whether the initializing switch 8 is turned on, which is carried out after the ignition switch is turned on, whether a control object wheel is a drive wheel or a driven wheel may be determined. When it is determined to be a drive wheel, the processing may proceed to the processing flow of FIG. 4 as explained in the first embodiment, and when it is determined to be the driven wheel, the processing may proceed to the processing flow of FIG. 5. The same goes with the second and the third embodiments.

In the above-described embodiments, the method of estimating driven wheel tire air pressure or the method of determining abnormality thereof is switched based on the vehicle speed, the signal intensity or the signal input intensity. That is, the tire air pressure estimating method using the resonance frequency and the method using the deviation of the rotational state values such as the wheel speed difference or the like are switched based on the vehicle speeds, the signal intensity or the signal input intensity. However, abnormality of the driven wheel tire air pressure may be always estimated based on the deviation of the rotational state values and the drive wheel tire air pressure may be estimated based on the corresponding resonance frequency. For example, in FIG. 5 of the first embodiment, step 110 through step 160 may be omitted, and the processing may proceed in an order from step 100 to steps 320, 330, 340 and 170. The same goes with the second and third embodiments.

Although according to the above-described embodiments, change in the tire resonance frequency is used to estimate tire air pressures of the drive and driven wheels or to detect abnormality thereof. However, tire air pressures of the drive and driven wheels may be estimated or abnormality thereof may be determined by estimating change of the tire spring constant. The change of the tire spring constant can be detected by detecting, for example, the change of the tire resonance frequency.

Further, all of analyzing methods such as FFT (high-speed Fourier transformation), linear projection method and so on are applicable to signal analyzing processing for wheel speed signals, which is carried out to detect resonance frequencies of the respective tires in the above-described embodiments.

[Fourth Embodiment]

In the fourth embodiment, as shown by a dotted line in FIG. 1, a signal from a brake switch (stop sw) 9 is fed to the ECU 6 and is used as one of conditions for analyzing the wheel speed signals. It is to be noted that, as the signal of the brake switch 9, a signal from a well-known stop lamp switch may be used. Further, if a brake system of the vehicle has a brake fluid pressure control device including a solenoid valve, in place of the road disturbance m (k), brake fluid pressure vibration which is caused by ON-OFF control of the solenoid valve and is transmitted to a wheel tire via a wheel cylinder can be used as a vibration source causing the vibration of the tire.

Next, a description will be given of a processing flow of the first embodiment in reference to a flowchart of FIG. 21. It is to be noted that, because the ECU 6 executes the same processing with regard to the respective tires 1a through 1d, the flowchart explained below shows only processing in respect of the tire 1a.

In FIG. 21, when an ignition switch of the vehicle is turned on, it is determined whether the initializing switch 8 is turned on at step 10. When the initializing switch 8 is not turned on, the wheel speed Vx is calculated as explained in the first embodiment.

At step 110, it is determined whether a vehicle speed V calculated from the wheel speeds Vx is equal to or less than a predetermined speed V01.

When the vehicle speed V is higher than the predetermined speed V01, that is, when the running speed of the vehicle is in a high speed range, it is determined at step 900 whether the brake switch 9 is turned on. Only when the brake switch 9 is determined to be turned on, step 220 and following steps are carried out. That is, the brake switch 9 functions as a determining device for determining whether the wheel speed signal is suitable for estimating the tire air pressure based on the resonance frequency or spring constant extracted therefrom.

As described above in reference in FIGS. 10A and 10B, the change of the second resonance peak in response to the change of tire air pressure is large with regard to a drive wheel, but small with regard to a driven wheel.

The reason that the change of the second resonance peak is large with regard to the drive wheel is in that the driving force is always operated between the road surface and the drive wheel tire, and the tread portion (an outer peripheral portion) of the drive wheel tire is stably brought into contact with the road surface.

Figure 22:
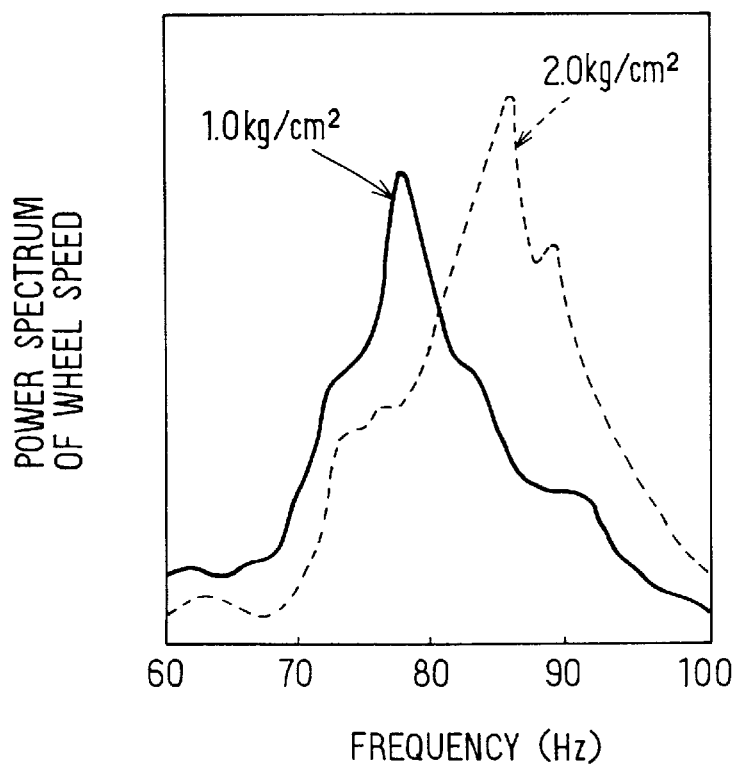

However, the driving force is not operated to the driven wheel. Therefore, the inventors have investigated on an effect of braking force by which an effect similar to that of the driving force can be expected. As a result, as shown in FIG. 22, it has been clarified that the change of the second resonance peak in response to the change of tire air pressure is significantly manifested in the driven wheel, similar to the drive wheel, when the braking force is applied to the vehicle. That is, it is time when the brake switch 9 is brought into an ON-state, in other words, when wheel braking force is applied on wheels. It is considered as a factor for significantly manifesting the change of the second resonance peak with respect to the driven wheel that, when the wheel braking force is applied on the wheels, force for bringing a tire of a wheel in contact with a road surface, that is, so-to-speak tire grip force becomes large compared with that in the case where the wheel braking force is not applied, and the rep vibration input from the road surface to the tire is enhanced. It is to be noted that, even if vibration input to the tire is given not from irregularities of a road surface but from brake fluid pressure vibrations caused by the ON-OFF operation of the solenoid valve used for anti-skid control or the like, when braking force is applied on the wheels, since the force for causing the tires to contact the road surface is enhanced, the vibration of the tire caused by the pressure vibrations becomes larger than that in the case where the braking force is not applied thereon.

Step 220 and the following steps are the same as those in FIG. 4.

When the brake switch 9 is in an OFF-state and the vehicle running speed is equal to or higher than the predetermined speed V01, although calculation of the wheel speed Vx is repeatedly carried out, the processing does not proceed to step 220 and the following steps.

An additional step may be provided between step 110 and step 900 to determine whether a control object wheel is a drive wheel or a driven wheel. When the control object wheel is the drive wheel, the processing may directly proceed to step 220 without carrying out step 900. This is because the tire air pressure of the drive wheel can be estimated based on the second resonance peak, even when the brake switch 9 is not turned on.

[Fifth Embodiment]

In the fifth embodiment, if the running speed of a vehicle exceeds a predetermined speed V02, that is, the vehicle running speed is in a high speed range, tire air pressure is estimated based on the corresponding second resonance peak calculated from vibration components of a wheel speed signal, only when an intensity of vibration input from a road surface is falls in a predetermined range.

An explanation will be given of the flowchart of FIG. 23 according to the fifth embodiment.

Because steps 10, 100 and 110 are the same as those in FIG. 21, the explanation thereof is omitted. It is to be noted that a predetermined speed V02 used in step 110 may be the same as the predetermined speed V01 in the first embodiment or may be different therefrom.

Further, an explanation from steps 120 and 160 illustrated in FIG. 23 will be omitted since these steps are the same as the contents of processing which have already been explained in the first embodiment. The following description concerns the processing (step 910 and the followings) carried out when the vehicle speed V calculated at the step 110 is higher than the predetermined speed V02.

At step 910, a band-pass filtering process (filter C) is carried out so that signals of frequencies other than frequencies including the vibration components of the tire vibration phenomenon caused by vibration input from the road surface, are cut off to further intensify the vibration input signal intensity.

At step 920, the vibration input signal intensity Gc is calculated from the vibration frequency components input from the road surface of which the signal intensity is intensified at step 821, and a magnitude thereof is compared with a predetermined reference value Gco.

A specific method of calculating signal intensity Gc is the same as the method explained in reference to FIG. 19 or the method explained in reference to FIG. 20.

Calculated signal intensity Gc and the predetermined reference value Gco are compared with each other at step 920. When the vibration input signal intensity Gc is larger, the processing proceeds to step 220 and the followings the same as those in FIG. 4. That is, the tire air pressure is estimated based on the second resonance peak. When the vibration input signal intensity Gc is smaller and the vehicle running speed is higher than the predetermined speed V02, although calculation of the wheel speed Vx is repeatedly carried out, the processing does not proceed to step 220 and the following steps.

[Sixth Embodiment]

Figure 24:
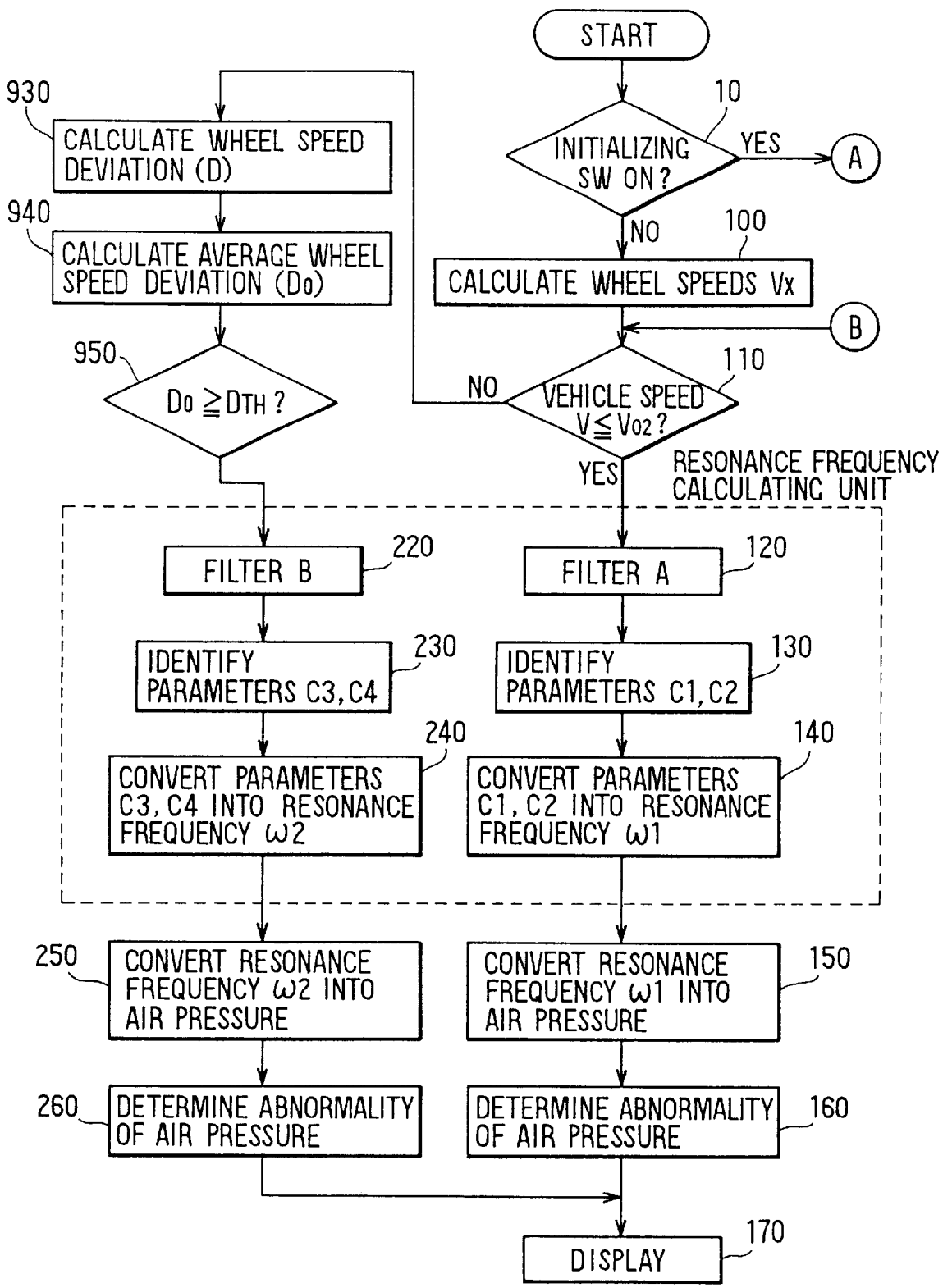
FIG. 24 is a flowchart showing a processing flow according to a sixth embodiment.

In the sixth embodiment, if the running speed of a vehicle exceeds a predetermined speed V02, that is, the vehicle running speed is in a high speed range, tire air pressure is estimated based on the corresponding second resonance peak calculated from vibration components of a wheel speed signal, only when a vehicle is in a turning state. FIG. 24 shows a flowchart of the sixth embodiment.

An explanation of steps 10 to 170 and steps 220 to 260 illustrated in FIG. 24 is omitted since these are the same as the contents of processing which have already been explained in the first embodiment. In the following description, the processing (steps 930 and the followings) carried out when the vehicle speed V calculated at step 110 is higher than the predetermined speed V02, are explained.

At step 930, tire rotational state values such as values produced by integrating wheel speeds or the like are used to determine whether a vehicle is in a turning state. That is, a wheel speed deviation D is calculated by the following Equation (18) using the detected wheel speeds Vx of a front right and front left wheels the vehicle. It is to be noted that the calculation of the wheel speed deviation D is carried out at every calculation period of the wheel speed, for example, at every 5 ms.

$$D=|Vxfr-Vxfl| \qquad (18)$$

wherein Vxfr is a wheel speed of the front right wheel and Vxfl is a wheel speed of the front left wheel.

At step 940, a predetermined number (n) of the wheel speed deviations D calculated as mentioned above is stored in a memory of the ECU 6 and is averaged by the following Equation (19).

$$Do = \sum_{k=1}^{n} D(k)/n \qquad (19)$$

The purpose of the processing resides in that although influenced by a road shape is considered to be comparatively small on a road where high speed running is feasible, the wheel speeds Vx yet receive influence of slope ascending or slope descending or the like and accordingly, it is to be removed.

At step 950, it is determined whether the average wheel speed deviation Do calculated as mentioned above is larger or smaller than a predetermined reference value DTH. When the average wheel speed deviation Do exceeds the reference value DTH, the vehicle is determined to be in a turning state and tire air pressure is estimated based on the second resonance peak extracted from only the wheel speed signals in this situation.

The estimation of tire air pressure in the turning state may be carried out only with respect to a wheel located at an outside of a turning circle. That is, because a load for causing a tire to contact the road surface is increased with respect to the wheel located at an outside of a turning circle (for example, in turning to the right, front and rear left wheels) by movement of load in the vehicle body, vibration input from the road surface is considered to become large. Therefore, an additional step of determining whether a processing object wheel it a wheel located at an outside or an inside of a turning circle may be provided. In this case, a wheel having, for example, a higher average wheel speed is selected as the wheel located at the outside of the turning circle.

[Seventh Embodiment]

Figure 25:
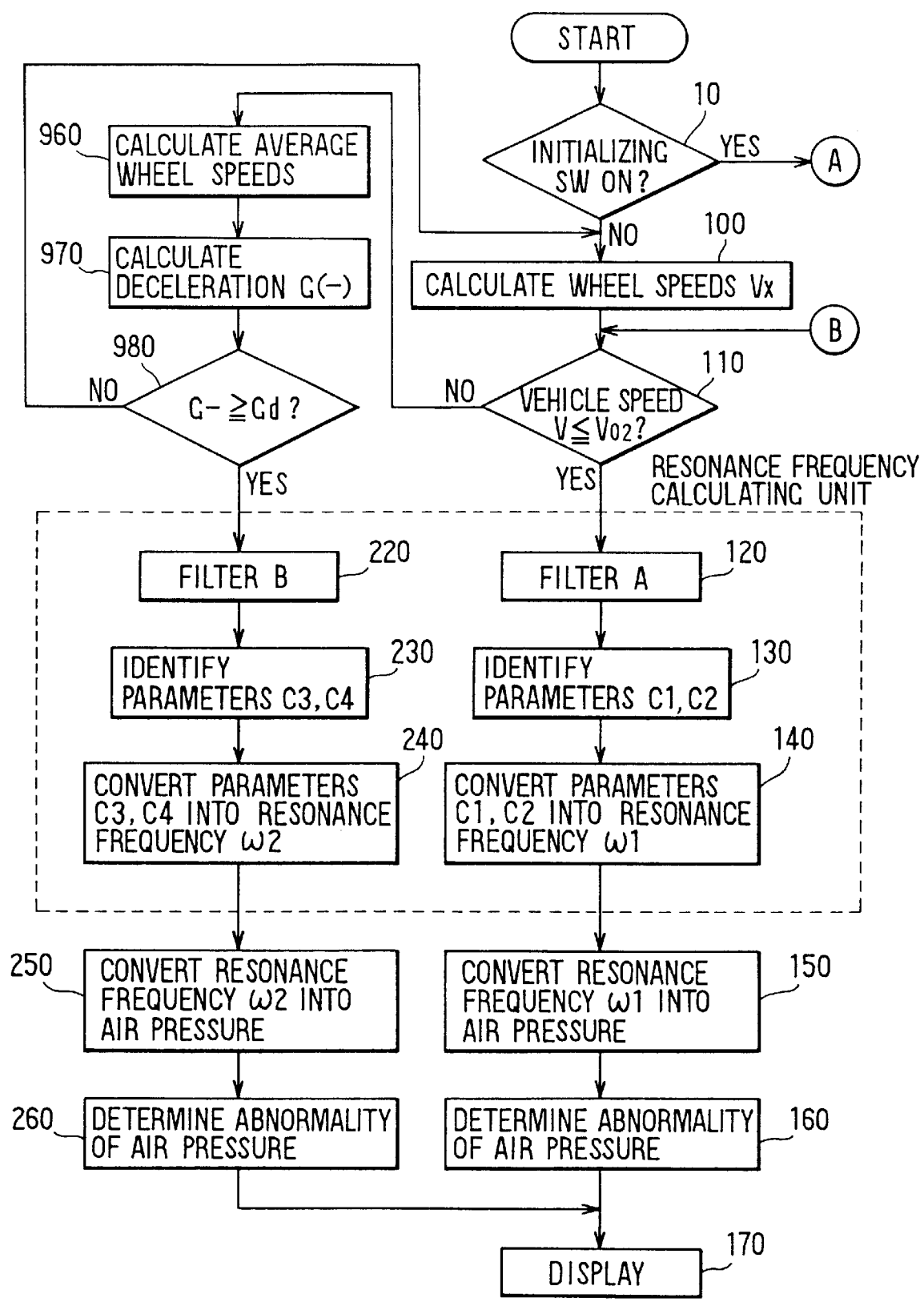
FIG. 25 is a flowchart showing a processing flow according to a seventh embodiment.

In the seventh embodiment, if the running speed of a vehicle exceeds a predetermined speed V02, that is, the vehicle running speed is in a high speed range, tire air pressure is estimated based on the corresponding second resonance peak calculated from vibration components of a wheel speed signal, only when a vehicle body (or wheels) is in a decelerating state. FIG. 25 shows a flowchart of the seventh embodiment.

An explanation of steps 10 to 170 and steps 220 to 260 illustrated in FIG. 25 is omitted since these are the same as the contents of processing which have already been explained in the first embodiment. In the following description, the processing (steps 960 and the followings) carried out when the vehicle speed V calculated at step 110 is higher than the predetermined the V02, are explained. Is an embodiment in which tire air pressure is estimated only when a vehicle or a wheel is brought into a decelerating state as selecting means for selecting wheel speed signals in accordance with a running situation of the vehicle and FIG. 15 shows a flowchart thereof. In the following, a case in which a vehicle decelerating state is detected based on the wheel speed Vx is described.

At step 960, a representative wheel (for example, right front wheel or the like) for representing a decelerating state of a vehicle is determined, and a preceding value Vhb of an average wheel speed as well as a current value Vhn thereof is calculated by the following Equation (20) using the wheel speed Vx detected with respect to the representative wheel. It is to be noted that calculation of the wheel speed Vx is carried out at every calculating period of the wheel speed, for example, at every 5 ms.

$$Vhb = \sum_{k=1}^{n} Vx(k)/n \qquad (20)$$

That is, the preceding value Vhb of the average wheel speed is calculated by storing a predetermined number (n) of the wheels speed values Vx calculated at every calculation period of the wheel speed in a memory of the ECU 6 and averaging them.

The current value Vhn of the average wheel speed is calculated in the similar manner with the preceding value Vhb.

As described above, the average wheel speed Vh can be calculated by time-sequentially adding each predetermined number (n) of wheel speed values Vx. In this case, a latest average wheel speed is referred to as the current value Vhn, and the average wheel speed calculated at one preceding calculating period is referred to as the preceding value Vhb.

At step 970, a deceleration G(−) is calculated from a difference between the preceding value and the current value of the average wheel speed by the following Equation (21).

$$\text{Deceleration } G(-)=Vhb-Vhn$$

At step 980, a comparison of whether the deceleration G(−) is larger or smaller than a predetermined value Gd is carried out. That is, it is determined whether the vehicle is in a decelerating state.

Only when the vehicle is determined to be in the decelerating state at step 980, the processing proceeds to step 220 and the following steps. Otherwise, calculation of wheel speed at step 100 is repeated.

Alternatively, decelerating states of respective wheels may be determined at steps 960 through 980, in stead of the decelerating state of the vehicle, and the processing of step 220 and the followings may be carried out with respect to only the wheels determined to be in the decelerating state. In this case, at step 960, an average wheel speed of each wheel in a predetermined reference time period is calculated. A wheel deceleration of each wheel is calculated at step 970. It is determined at step 980 whether the wheel deceleration Gw(−) of each wheel is larger than the reference value Gwd.

The vehicle decelerating state and the wheel decelerating state may be caused by a driver's braking operation or engine brake. Further, the vehicle decelerating state and the wheel decelerating state are both considered to determine whether the estimation of tire air pressure is to be carried out based on the second resonance peak. That is, the processing may proceed to step 220 only with respect to a wheel when the vehicle deceleration G(−) is equal to or more than the predetermined reference value Gd, and the wheel deceleration Gw(−) thereof is equal to or more than the predetermined reference value Gwd to permit the estimation of tire air pressure. In this case, erroneous estimation of tire air pressure can be prevented as less as possible and further accurate estimation of tire air pressure can be carried out.

The present invention is not limited to the above-described fourth through seventh embodiments but can be modified variously.

For example, according to the respective embodiments, when the wheel speed signal vibration components are filtered to extract tire resonance frequency therefrom, frequency values defining a pass band of a filter are changed depending on a braking state which is detected by the brake switch 9, the magnitude of vibration input from a road surface (vibration input intensity), a turning state of a vehicle, or a decelerating state of a vehicle or a wheel, which are used as vehicle running conditions independent from each other. However, the filter frequency values may be changed by combining the respective conditions. For example, the processing may proceed to step 220 and the followings (filter B portion) in the respective flowcharts when the magnitude of vibration input from a road surface is large enough, the brake switch 9 is turned on, the vehicle is in a turning state, and a vehicle or a wheel is in a decelerating state. The order of the conditions to be determined can be set arbitrarily.

Further, according to the above-described respective embodiments, when the running state of a vehicle does not satisfy the conditions such as the ON-state of a brake switch 9, the large magnitude of vibration input from a road surface, the vehicle turning state or the deceleration state of a vehicle or a wheel, for example, when the ON-state of the brake switch 9 is negatively determined at step 900 of FIG. 20, the processing returns to a wheel speed calculating step (step 100) and tire air pressure is not estimated. However, when these conditions are not satisfied, tire air pressure may be estimated by comparing respective wheel speeds with each other, or based on differences among the respective wheel speeds. According to determination of tire air pressure using the wheel speed values, for example, wheel speeds of all of wheels may be compared, or differences among the respective wheel speeds may be obtained when a vehicle is neither in an accelerating or decelerating state nor in a turning state. A wheel of which the wheel speed is larger by a reference value than the wheel speeds of the other wheels may be determined as a wheel in which the dynamic load radius of the tire is reduced because of the lowering of tire air pressure. Also, in the above-described case, a tire rotational state value other than the wheel speed value can be used to specify the wheel of which air tire pressure lowers.

Although according to the above-described respective embodiments, the estimation of tire air pressure is carried out based on the resonance frequency of a tire, the estimation of tire air pressure may be carried out based on a tire spring constant calculated from the resonance frequency of the tire or a tire spring constant equivalent to the resonance frequency of the tire.

Further, tire air pressure is estimated without discriminating between a driven wheel and a drive wheel according to the above-described respective embodiments. However, when the running speed of a vehicle is in a high speed range, a power spectrum of a wheel speed signal of a drive wheel is large since the driving force output from an engine is transmitted to the drive wheel and the power spectrum of a wheel speed signal of a driven wheel is small since the driving force output from the engine is not transmitted to the driven wheel. Because the change of the higher order resonance frequency (second resonance peak) relative to the change of tire air pressure is manifested considerably and stably, the tire air pressure of the drive wheel may be estimated by step 220 and the followings (filter B portion) based on the the range of 60–90 Hz) without considering the vehicle running conditions or the magnitude of vibration input from a road surface. In this case, the tire air pressure of a driven wheel may be estimated in view of the vehicle running conditions or the magnitude of vibration input from a road surface.

What is claimed is:

1. A tire air pressure estimating apparatus comprising:
   a vehicle speed detecting device for successively calculating wheel speeds of respective wheels when a vehicle is running;
   an extracting device for extracting at least one of a tire resonance frequency and a tire spring constant with respect to each of wheel tires from vibration frequency components included in wheel speed signals which are detection results of said wheel speed detecting device;
   a first tire air pressure estimating device for estimating tire air pressures of drive wheels based on said at least one of said tire resonance frequencies and said tire spring constants extracted by said extracting device, wherein said first tire air pressure estimating device includes a selecting device for selecting a vibration frequency range of said vibration frequency components included in said wheel speed signal from which said at least one of said tire resonance frequency and tire spring constant is to be extracted by said extracting device, and tire air pressures of said drive wheels are estimated based on said at least one of said tire resonance frequency and tire spring constant extracted from said vibration frequency range selected by said selecting device;
   a rotational state value calculating device for calculating rotational state values of driven wheel tires based on said wheel speeds detected by said wheel speed detecting device; and
   a second tire air pressure estimating device for estimating tire air pressures of driven wheels based on deviations of said rotational state values calculated by said rotational state value calculating device.

2. A tire air pressure estimating apparatus according to claim 1, wherein said selecting device includes a running speed detecting device for detecting a running speed of said vehicle and selects said vibration frequency range based on said running speed.

3. A tire air pressure estimating apparatus according to claim 1, wherein said selecting device comprises:
   a dividing device for dividing said vibration frequency components into a plurality of vibration frequency ranges; and a signal intensity calculating device for calculating signal intensities in said respective vibration frequency ranges, wherein said selecting device selects said vibration frequency range from which said at least one of said tire resonance frequency and tire spring constant is to be extracted among said vibration frequency ranges based on said signal intensities calculated by said signal intensity calculating device.

4. A tire air pressure estimating apparatus according to claim 1, wherein said selecting device calculates vibration input intensity from a road surface to said tires and selects said vibration frequency range based on said vibration input intensity.

5. A tire air pressure estimating apparatus comprising:
a vehicle speed detecting device for successively calculating wheel speeds of respective wheels when a vehicle is running;
an extracting device for extracting at least one of a tire resonance frequency and a tire spring constant with respect to each of wheel tires from vibration frequency components included in wheel speed signals which are detection results of said wheel speed detecting device;
a first tire air pressure estimating device for estimating tire air pressures of drive wheels based on said at least one of said tire resonance frequencies and said tire spring constants extracted by said extracting device;
a rotational state value calculating device for calculating rotational state values of driven wheel tires based on said wheel speeds detected by said wheel speed detecting device; and
a second tire air pressure estimating device for estimating tire air pressures of driven wheels based on deviations of said rotational state values calculated by said rotational state value calculating device, wherein said second tire air pressure estimating device includes a condition determining device for determining whether conditions for carrying out estimation of said tire air pressure based on said rotational state values are satisfied.

6. A tire air pressure estimating apparatus according to claim 5, wherein said condition determining device includes a running speed detecting device for detecting a running speed of said vehicle and determines whether said conditions are satisfied based on said running speed.

7. A tire air pressure estimating apparatus comprising:
a wheel speed detecting device for successively calculating wheel speeds of respective wheels when a vehicle is running:
an extracting device for extracting at least one of a plurality of tire resonance frequencies and a plurality of tire spring constants from vibration frequency components of a wheel speed signal with respect to each of wheel tires;
a selecting device for selecting at least one of a tire resonance frequency and tire spring constant used for estimating tire air pressure among said at least one of said plurality of tire resonance frequencies and said plurality of tire spring constants based on a running state of said vehicle with respect to each of said wheel tires;
a determining device for determining, based on said running state of said vehicle, whether said wheel speed signal is suitable for estimating said tire air pressure based on said at least one of said tire resonance frequency and tire spring constant extracted therefrom and selected by said selecting device; and a tire air pressure estimating device for estimating said tire air pressure based on said at least one of said tire resonance frequency and tire spring constant selected by said selecting device and extracted from said wheel speed signal detected when said determining device determines that said wheel speed signal is suitable for estimating said tire air pressure based on said at least one of said tire resonance frequency and tire spring constant extracted therefrom.

8. A tire air pressure estimating apparatus according to claim 7, wherein said determining device includes a detecting device for detecting a vehicle running state in which at least one of braking force and driving force is operated in said vehicle, and said determining device allows said at least one of said tire resonance frequency and tire spring constant to be extracted and selected from said wheel speed signal detected when said at least one of said braking force and driving force is operated on said vehicle.

9. A tire air pressure estimating apparatus according to claim 7, wherein said determining device includes a calculating device for calculating a vibration input from a road surface when said vehicle is running, and said determining device determines a magnitude of said vibration input based on a calculating result of said calculating device and allows said at least one of said tire resonance frequency and tire spring constant to be extracted and selected from said wheel speed signal detected when said magnitude of said vibration put falls in a predetermined range.

10. A tire air pressure estimating apparatus according to claim 7, wherein said determining device includes a turning state detecting device for detecting a turning state of said vehicle, and said determining device allows said at least one of said tire resonance frequency and tire spring constant to be extracted and selected from said wheel speed signal detected when said vehicle is in said turning state.

11. A tire air pressure estimating apparatus according to claim 7, wherein said determining device includes a decelerating state detecting device for detecting a decelerating state of said vehicle, and said determining device allows said at least one of said tire resonance frequency and tire spring constant to be extracted and selected from said wheel speed signal detected when said vehicle is in said decelerating state.

12. A tire air pressure estimating apparatus comprising:
a wheel speed detecting device including wheel speed sensors, for successively calculating wheel speeds of respective wheels based on wheel speed signals output from said wheel speed sensors when a vehicle is running;
an extracting device for extracting a tire resonance frequency with respect to each of wheel tires from vibration frequency components included in said wheel speed signals;
a running state detecting device for detecting a running state of said vehicle;
a changing device for changing a frequency band including said tire resonance frequency extracted by said extracting device based on a detection result of said running state detecting device; and
a tire air pressure estimating device for estimating a tire air pressure of each of said wheel tires based on said tire resonance frequency extracted from said frequency band changed by said changing device.

13. A tire air pressure estimating apparatus according to claim 12, wherein said extracting device includes a filter for carrying out filter-processing with respect to said wheel speed signals, and said changing device changes frequency values of said filter for defining said frequency band.

14. A tire air pressure estimating apparatus according to claim 13, wherein said filter has a plurality of filter portions, and said changing device changes frequency values of said filter by selecting one of said filter portions.

15. A tire air pressure estimating apparatus according to claim 13, wherein said running state detecting device detects a vehicle body speed of said vehicle, and said changing device changes said frequency values of said filter based on said vehicle body speed.

16. A tire air pressure estimating apparatus according to claim 13, wherein said running state detecting device detects a braking state of said vehicle, and said changing device changes said frequency values of said filter when said vehicle is in said braking state.

17. A tire air pressure estimating apparatus according to claim 13, wherein said running state detecting device detects braking states of said wheels, and said changing device changes said frequency values of said filter when said wheels are in said braking state.

18. A tire air pressure estimating apparatus according to claim 17, wherein said running state detecting device is a brake switch for detecting a brake pedal depressed by a driver.

19. A tire air pressure estimating apparatus according to claim 13, wherein said running state detecting device detects a turning state of said vehicle, and said changing device changes said frequency values of said filter when said vehicle is in said turning state.

20. A tire air pressure estimating apparatus according to claim 15, wherein said changing device includes a estimation stop device for stopping estimation of tire air pressure of a driven wheel when said vehicle is out of predetermined conditions whereas estimation of tire air pressure of a drive wheel is continued based on said tire resonance frequency extracted from said frequency band changed by said changing device in accordance with said vehicle body speed.

21. A tire air pressure estimating apparatus according to claim 13, wherein said running state detecting device detects a magnitude of a vibration input from a road surface to said tires, and said changing device changes said frequency values of said filter when said magnitude of said vibration input is larger than a reference value.

22. A tire air pressure estimating apparatus comprising:

a wheel speed detecting device including wheel speed sensors, for successively calculating wheel speeds of respective wheels based on wheel speed signals output from said wheel speed sensors when a vehicle is running;

an extracting device for extracting a tire resonance frequency with respect to each of wheel tires from vibration frequency components included in said wheel speed signals;

a vibration input determining device for determining whether a magnitude of a vibration input from a road surface to tires is larger than a reference value;

a changing device for changing a frequency band including said tire resonance frequency extracted by said extracting device based on a determination result of said vibration input detecting device; and a tire air pressure estimating device for estimating a tire air pressure of each of said wheel tires based on said tire resonance frequency extracted from said frequency band changed by said changing device.

23. A tire air pressure estimating apparatus according to claim 22, wherein said extracting device includes a band pass filter for allowing said wheel speed signals having predetermined frequencies to pass therethrough, and said changing device changes frequency values of said band pass filter.

24. A tire air pressure estimating apparatus according to claim 23, wherein said band pass filter has a plurality of band pass filter portions, and said changing device changes frequency values of said band pass filter by selecting one of said band pass filter portions.

25. A tire air pressure estimating apparatus according to claim 22, further comprising:

at least one of a vehicle braking state detecting device, a wheel braking state detecting device and a vehicle turning state detecting device, wherein said changing device means changes said frequency band based on detection results of said respective detecting devices in addition to said magnitude of said vibration input.

* * * * *